(12) United States Patent
Sakumoto

(10) Patent No.: US 10,225,083 B2
(45) Date of Patent: Mar. 5, 2019

(54) INFORMATION PROCESSING APPARATUS AND INFORMATION PROCESSING METHOD

(71) Applicant: SONY CORPORATION, Tokyo (JP)

(72) Inventor: Koichi Sakumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/907,973

(22) PCT Filed: Jul. 28, 2014

(86) PCT No.: PCT/JP2014/003963
§ 371 (c)(1),
(2) Date: Jan. 27, 2016

(87) PCT Pub. No.: WO2015/019572
PCT Pub. Date: Feb. 12, 2015

(65) Prior Publication Data
US 2016/0173277 A1    Jun. 16, 2016

(30) Foreign Application Priority Data
Aug. 5, 2013    (JP) .................................. 2013-162283

(51) Int. Cl.
*H04L 9/08* (2006.01)
*G06F 21/33* (2013.01)
(Continued)

(52) U.S. Cl.
CPC .............. *H04L 9/088* (2013.01); *G06F 21/33* (2013.01); *H04L 9/0894* (2013.01); *H04L 9/14* (2013.01);
(Continued)

(58) Field of Classification Search
CPC ......... H04L 9/088; H04L 9/0894; H04L 9/14; H04L 9/3247; H04L 63/06;
(Continued)

(56) References Cited

U.S. PATENT DOCUMENTS 6,772,341 B1    8/2004  Shrader et al.
7,000,108 B1    2/2006  Yarsa et al.
(Continued)

FOREIGN PATENT DOCUMENTS

CN    1954544 A    4/2007
DE    10-2008017630 A    10/2009
(Continued)

OTHER PUBLICATIONS

Office Action for JP Patent Application No. 2013-162283, dated Feb. 28, 2017, 10 pages of Office Action and 10 pages of English Translation.
(Continued)

*Primary Examiner* — Baotran N To
(74) *Attorney, Agent, or Firm* — Chip Law Group

(57) ABSTRACT

An information processing system includes circuitry that stores at least one secret key that corresponds to a public key. The circuitry also causes display, on a screen, of information corresponding to the public key and information corresponding to the secret key.

13 Claims, 20 Drawing Sheets

(51) Int. Cl.
*H04L 9/14* (2006.01)
*H04L 9/32* (2006.01)
*H04L 29/06* (2006.01)
*H04W 12/06* (2009.01)
*H04W 12/04* (2009.01)

(52) U.S. Cl.
CPC .......... *H04L 9/3218* (2013.01); *H04L 9/3247* (2013.01); *H04L 63/0823* (2013.01); *H04W 12/06* (2013.01); *H04L 63/06* (2013.01); *H04W 12/04* (2013.01)

(58) Field of Classification Search
CPC .. H04L 63/0823; H04L 9/3218; H04W 12/06; H04W 12/04; G06F 21/33
USPC ......................................................... 713/189
See application file for complete search history.

(56) References Cited

U.S. PATENT DOCUMENTS

| | | | |
|---|---|---|---|
| 2012/0150748 A1 | 6/2012 | Law et al. | |
| 2014/0351597 A1* | 11/2014 | Sakemi | H04L 63/0861 713/171 |

FOREIGN PATENT DOCUMENTS

| | | |
|---|---|---|
| DE | 102012200043 A1 | 7/2013 |
| EP | 2613491 A | 7/2013 |
| EP | 2613491 A1 | 7/2013 |
| JP | 2004-147019 A | 5/2004 |
| JP | 2005-204094 A | 7/2005 |
| JP | 2005-339273 A | 12/2005 |
| JP | 2007-515730 A | 6/2007 |
| JP | 2011-082952 A | 4/2011 |
| JP | 3250355 B | 11/2011 |

OTHER PUBLICATIONS

Taku Shimura, "Guidance of Common Sense/Senseless of the Internet", Internet ASCII, Japan, ASCII, Inc., Sep. 1, 1998, vol. 3, No. 9, pp. 122-125.
Symantec, "PGP(TM) Desktop for Windows", User's Guide 10.2, Version 10.2.0, Jul. 2011, pp. 308.
Office Action for JP Patent Application No. 2013-162283, dated Sep. 19, 2017, 7 pages of Office Action and 5 pages of English Translation.
Extended European Search Report of EP Patent Application No. 14755722.7, dated Jul. 26, 2017, 6 pages.
PGP(TM) Desktop for Windows User's Guide 10.2, 305 pages.
Office Action for CN Patent Application No. 201480042839.X, dated Apr. 3, 2018, 08 pages of Office Action and 14 pages of English Translation.
Office Action for CN Patent Application No. 201480042839.X, dated Sep. 14, 2018, 08 pages of Office Action and 14 pages of English Translation.

* cited by examiner

[Fig. 1]
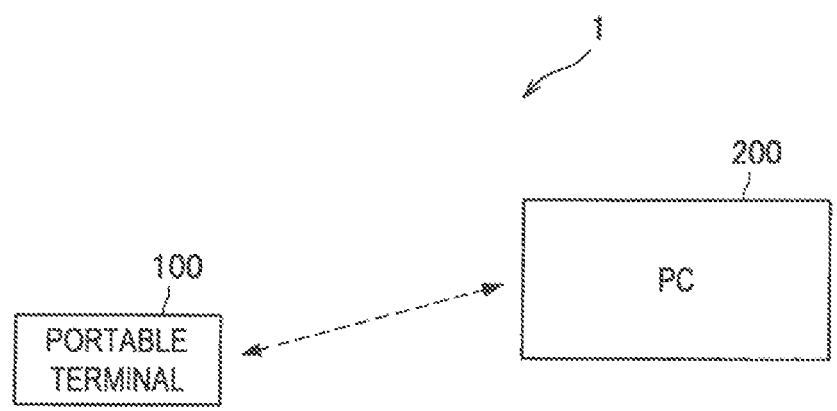

[Fig. 2]
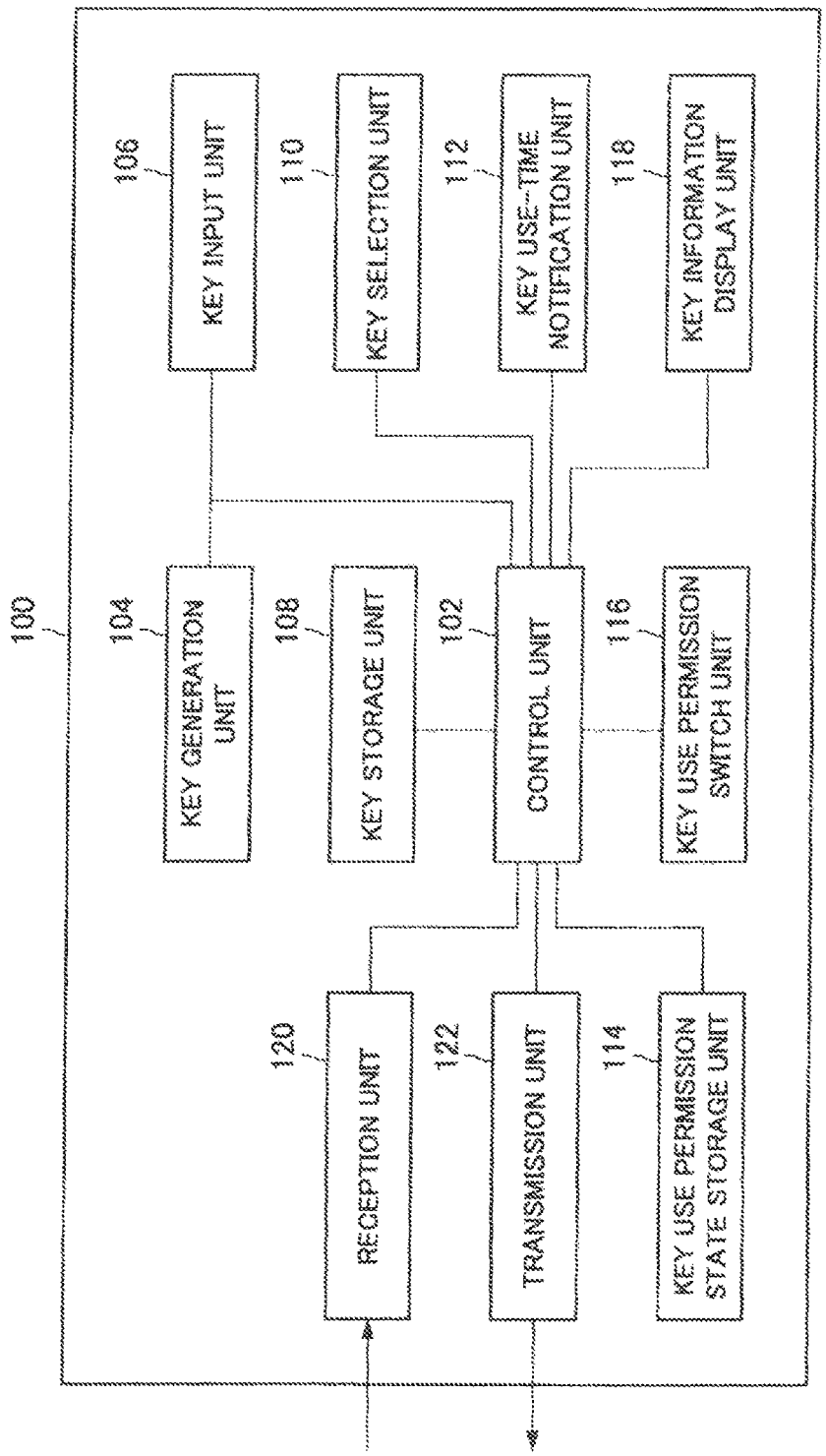

[Fig. 3]
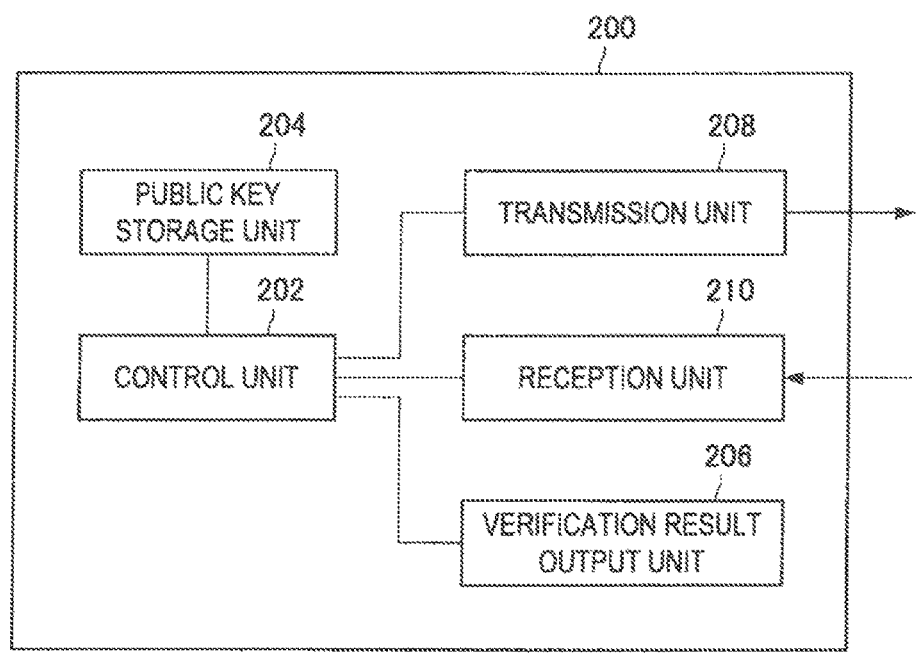

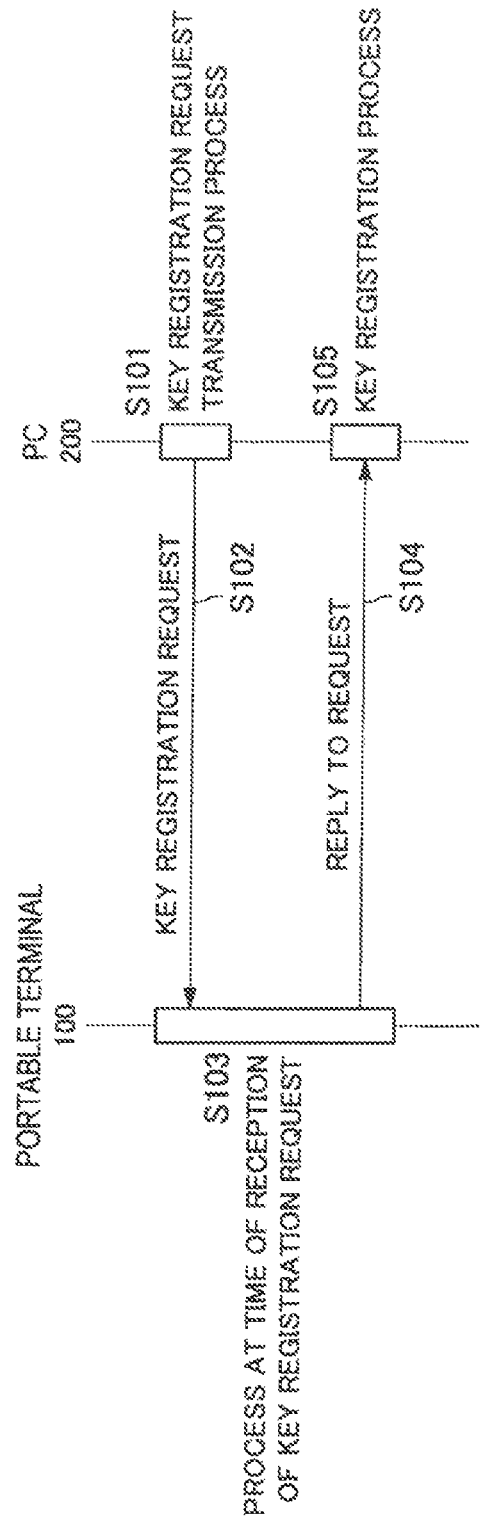

[Fig. 5]
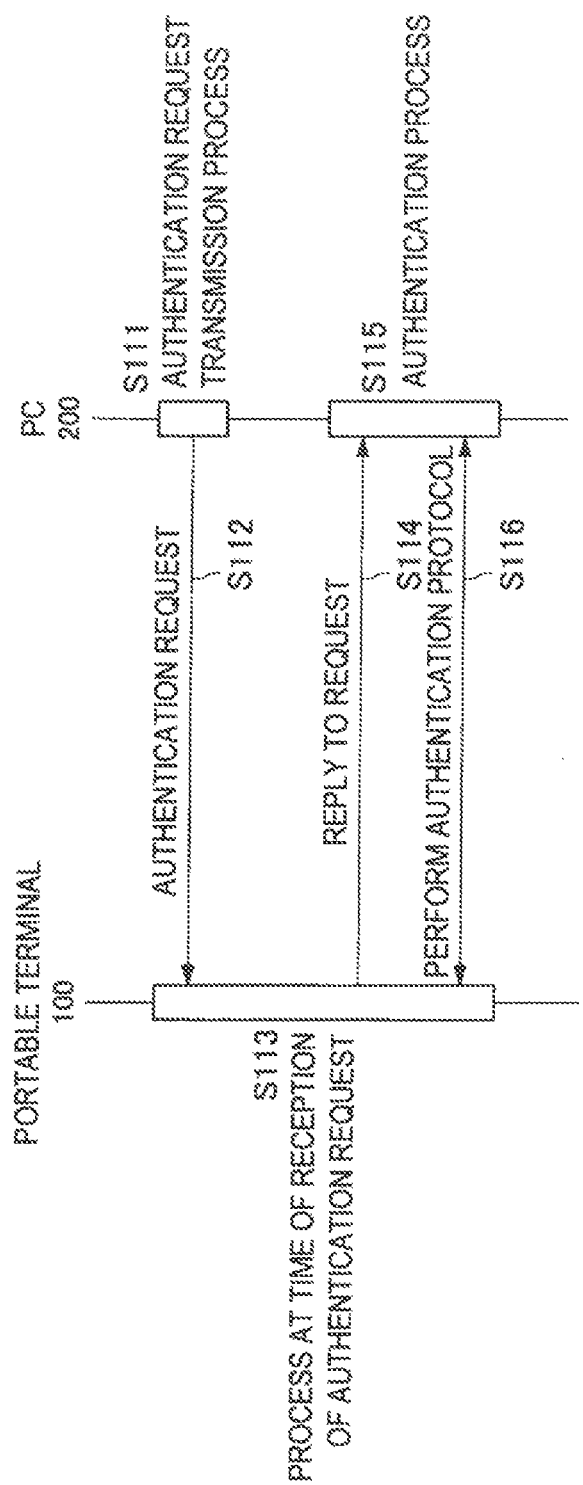

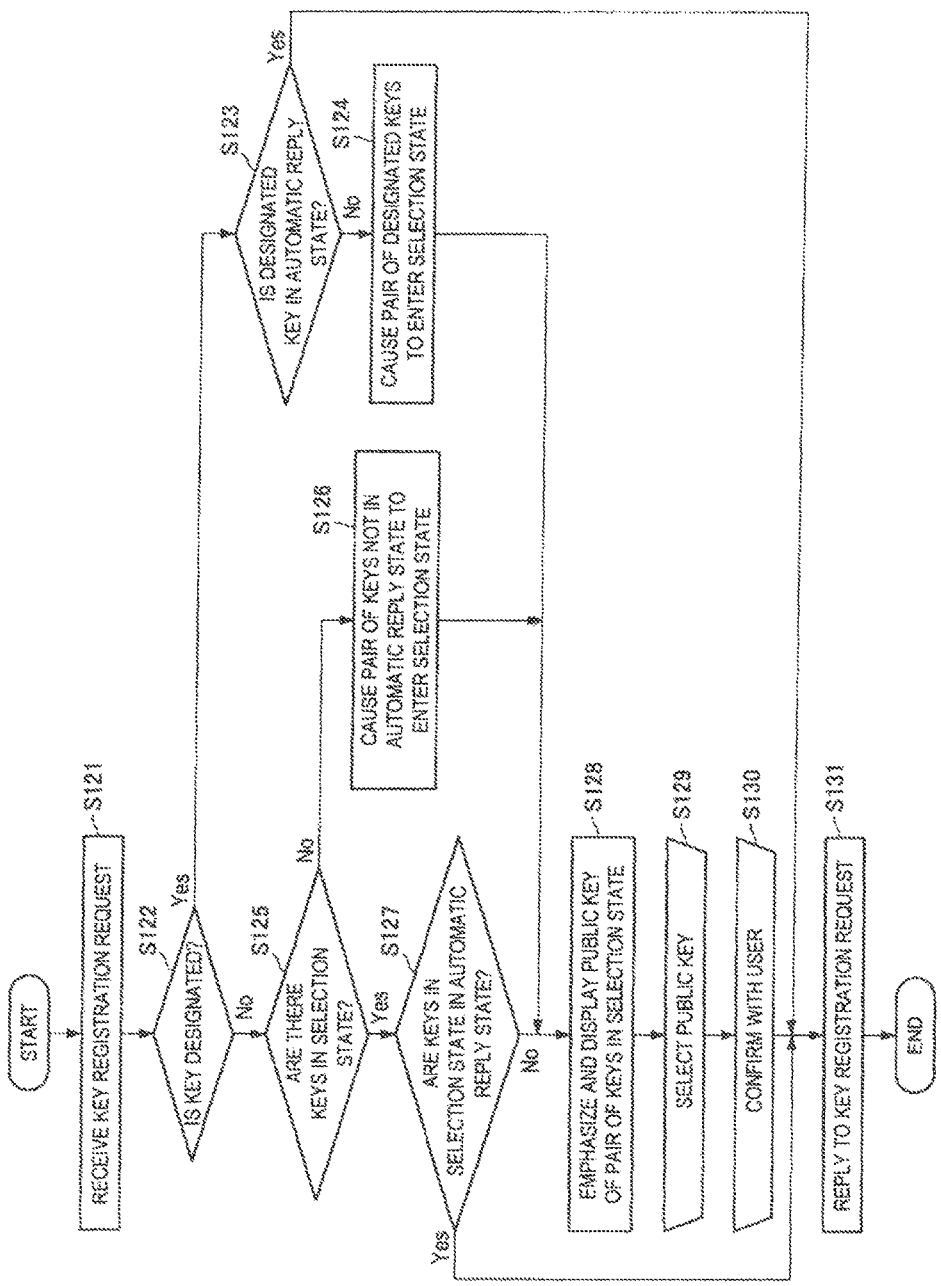
[Fig. 6]

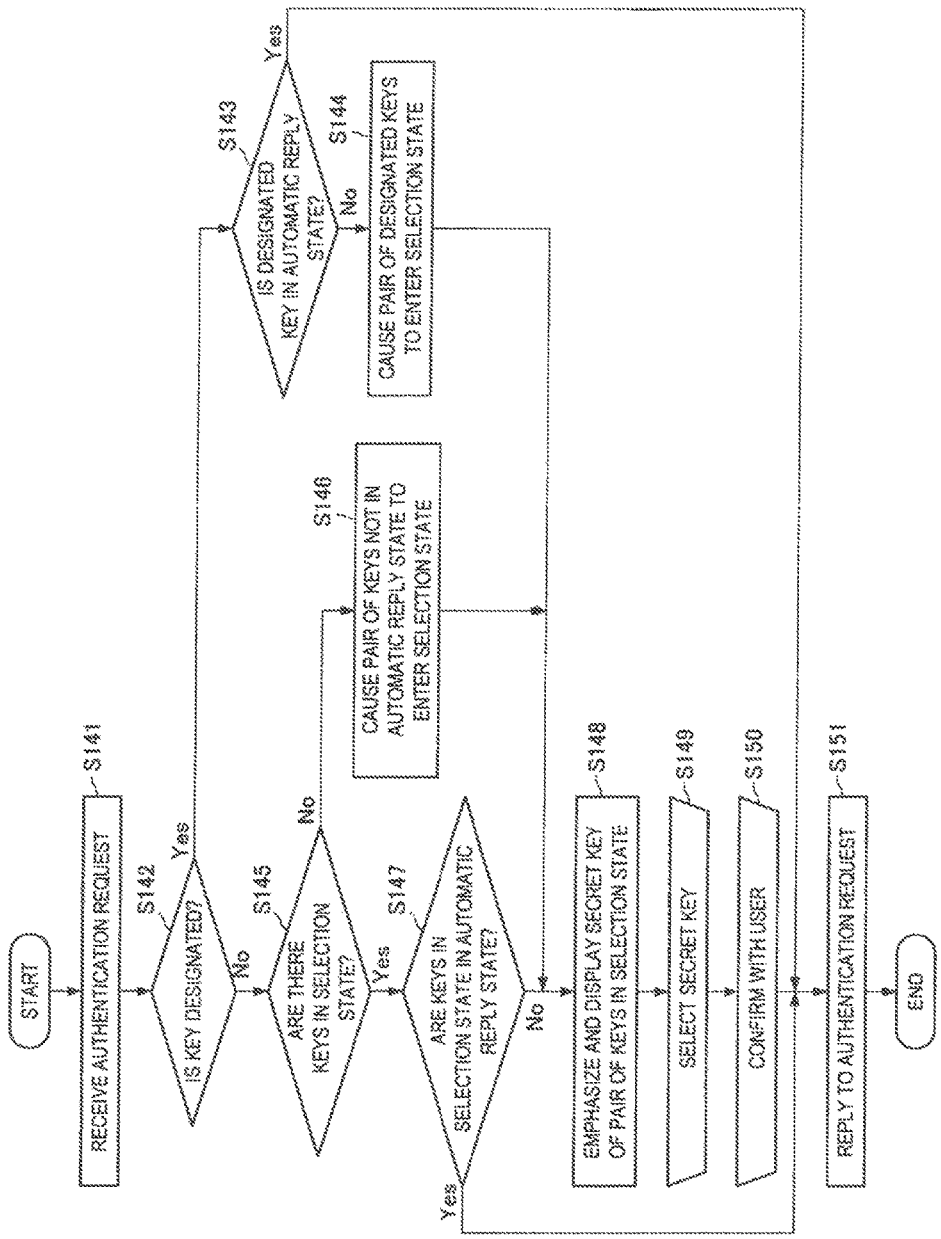
[Fig. 7]

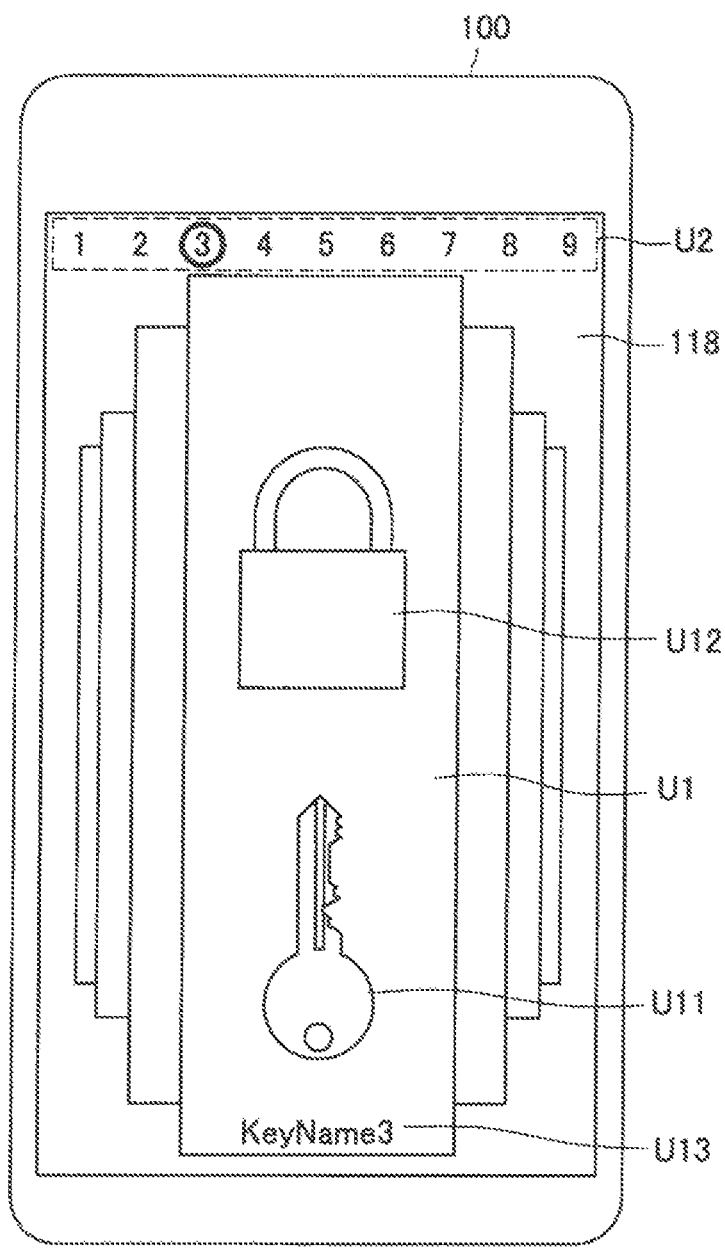
[Fig. 8]

[Fig. 9]
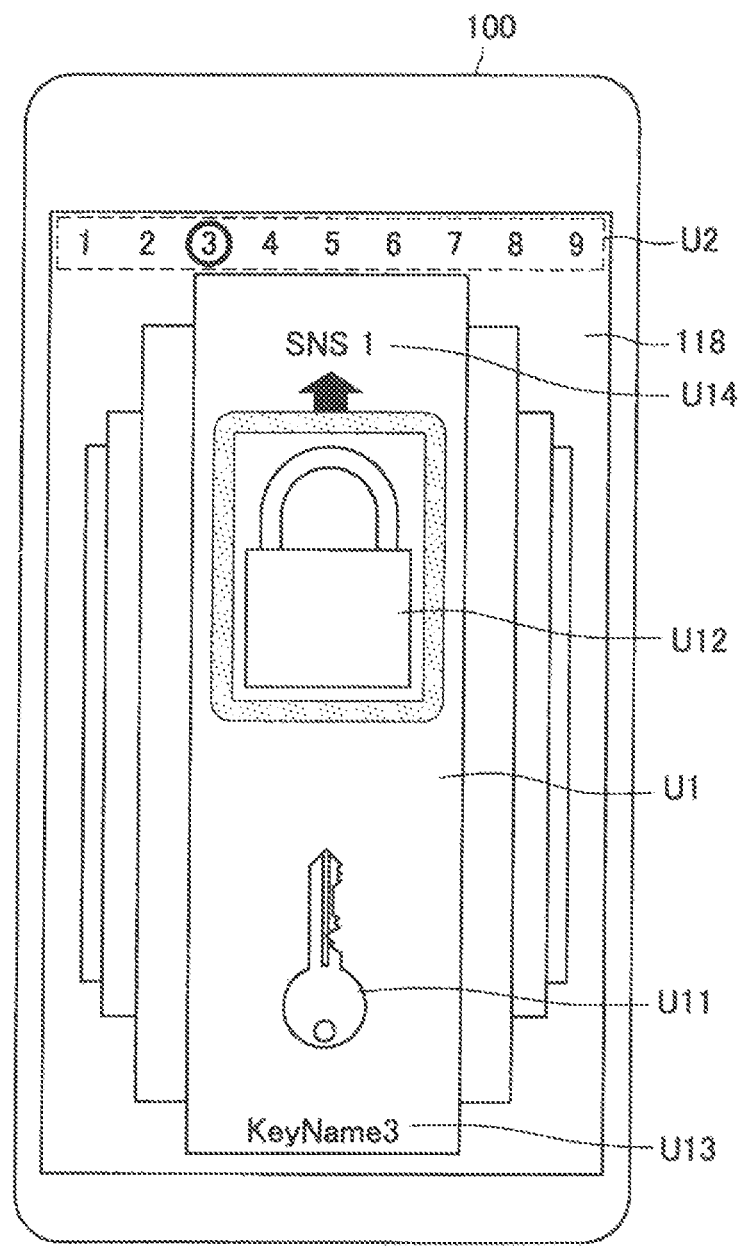

[Fig. 10]
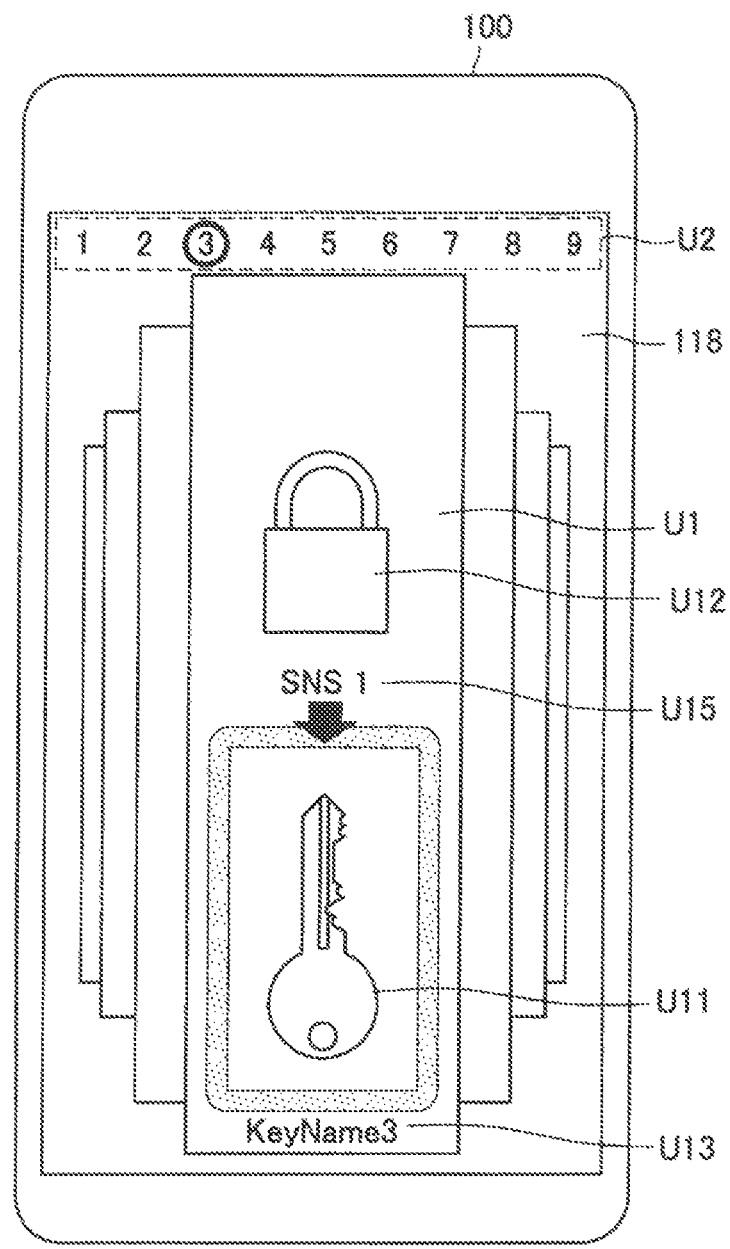

[Fig. 11]
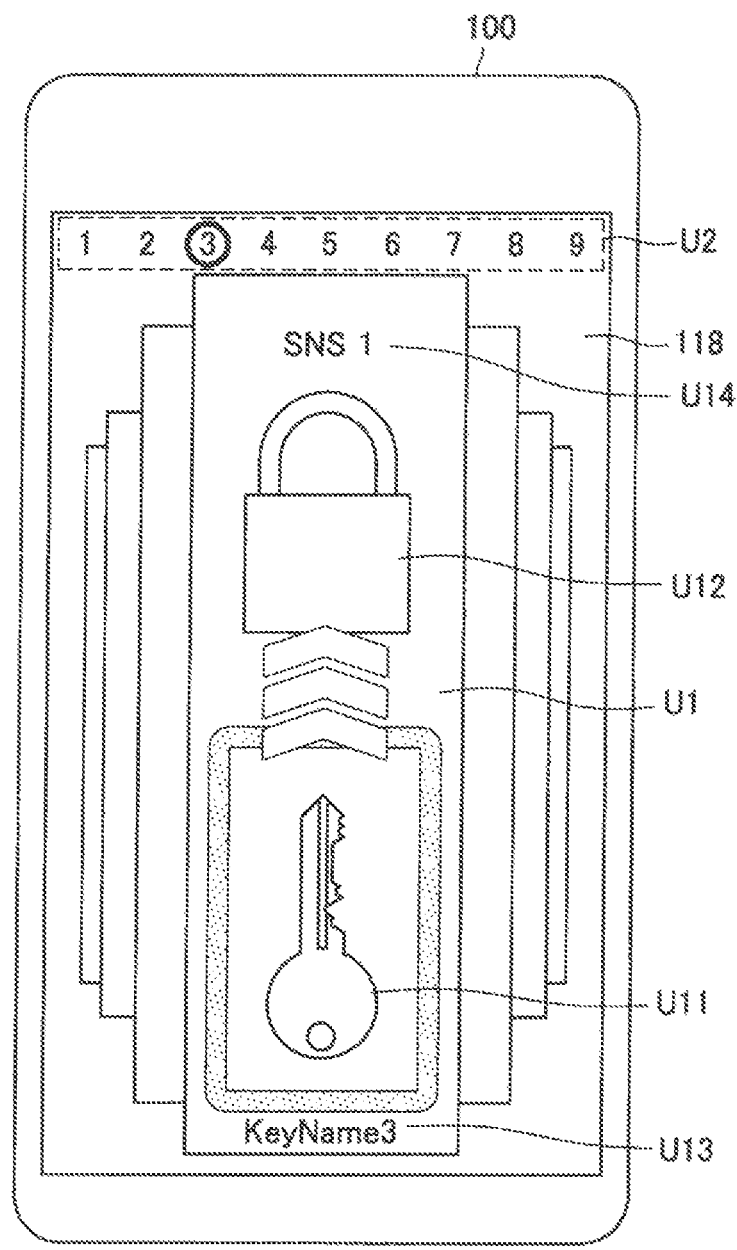

[Fig. 12]
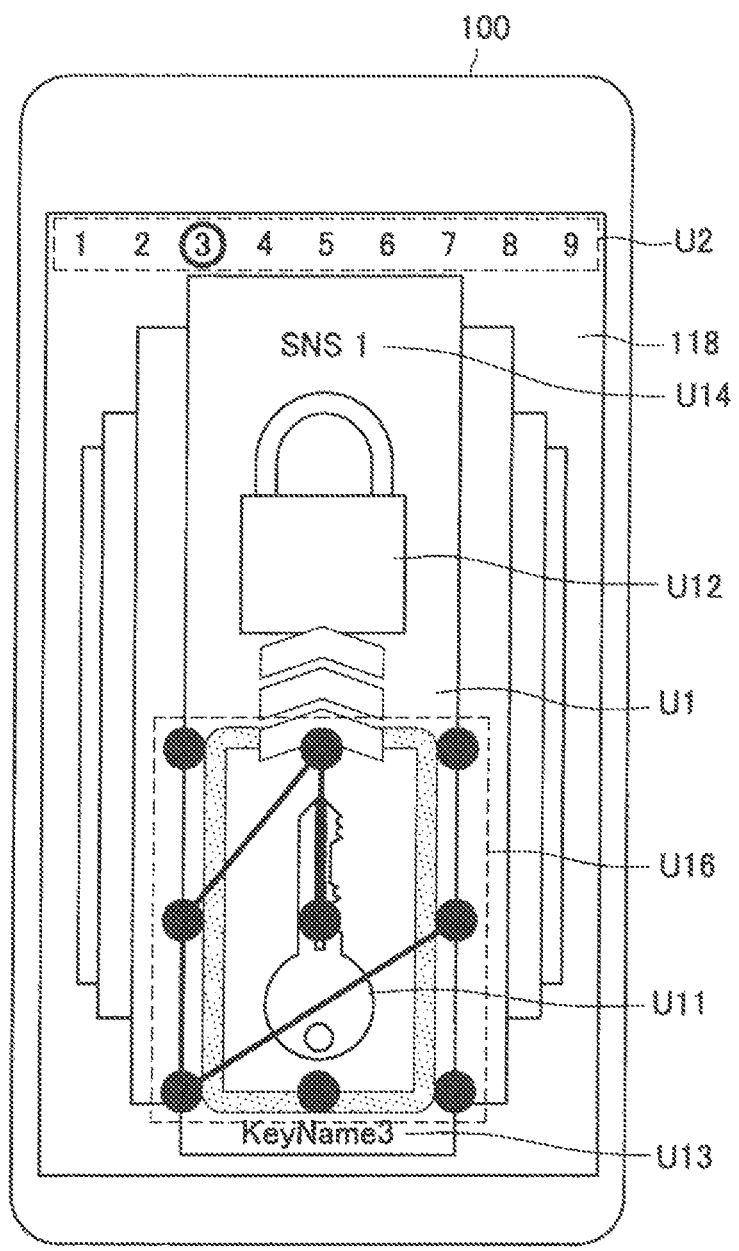

[Fig. 13]
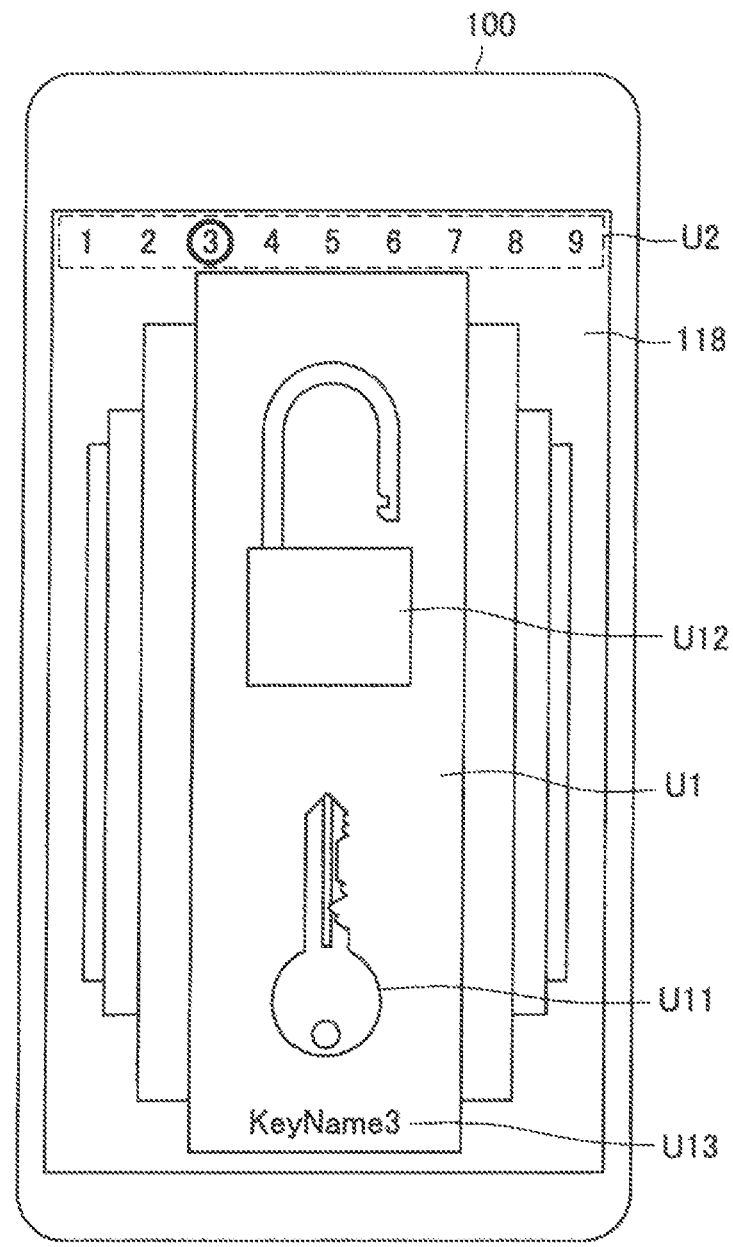

[Fig. 14]
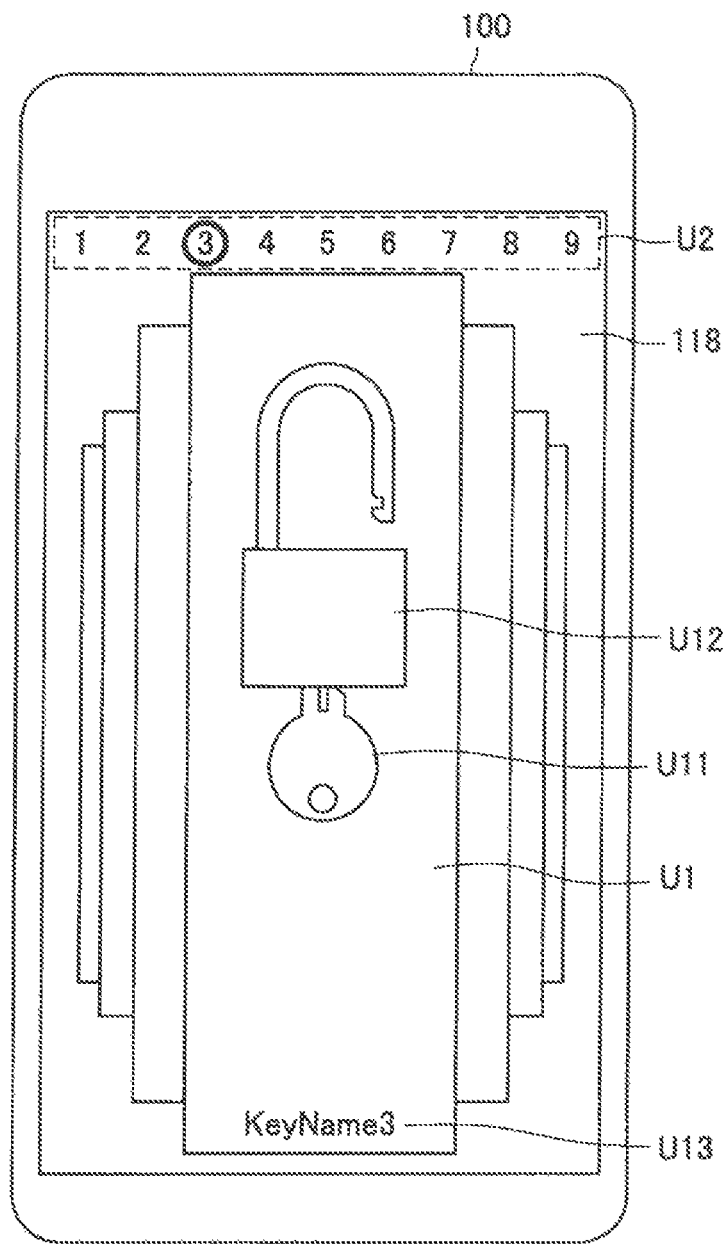

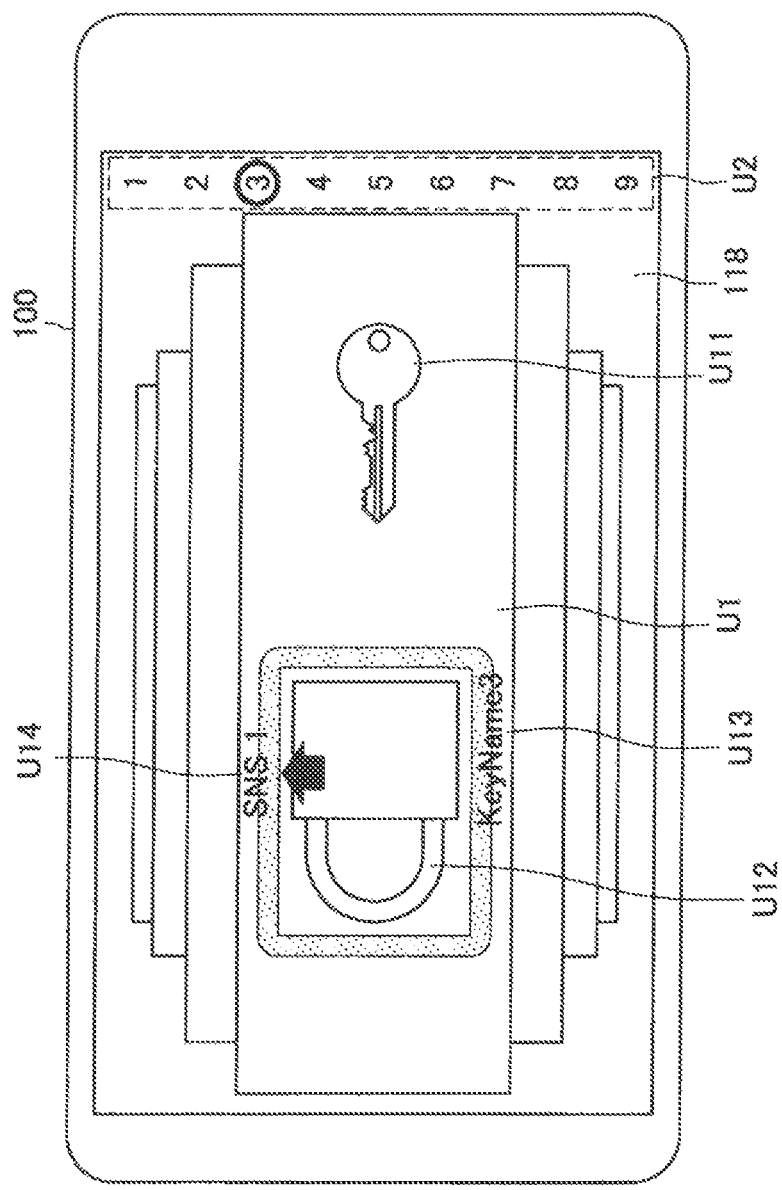
[Fig. 15]

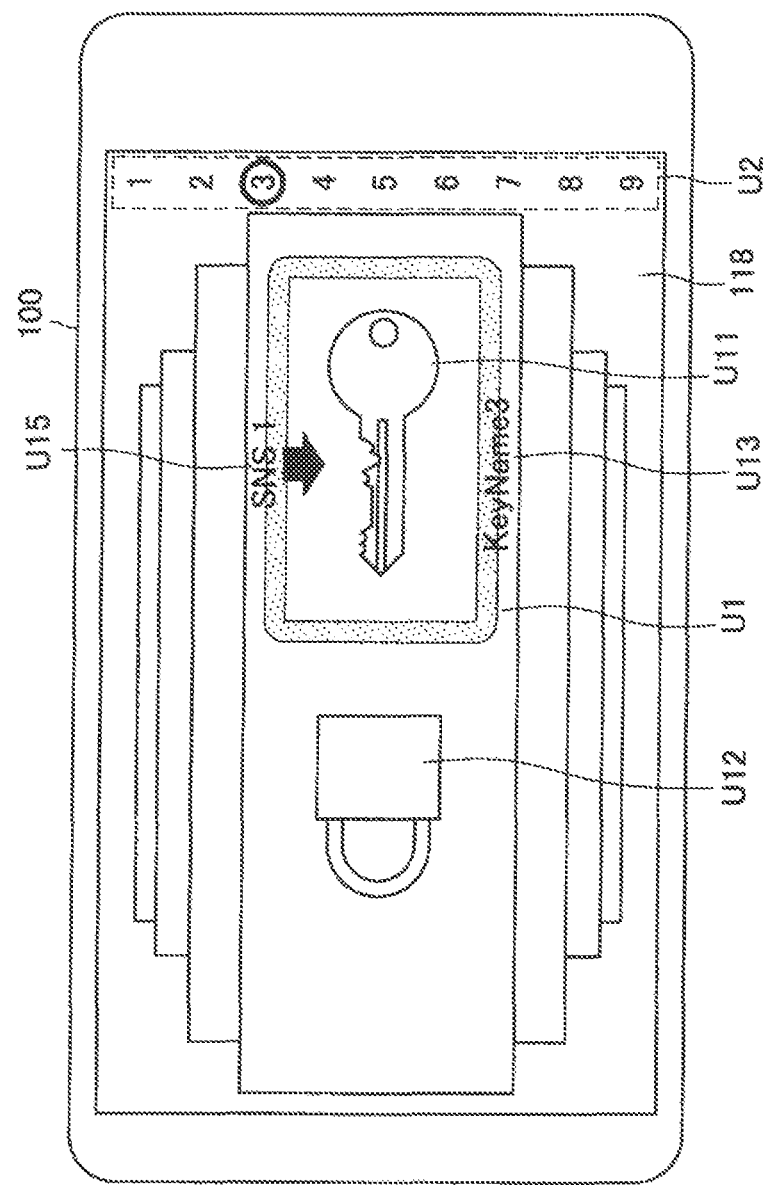
[Fig. 16]

[Fig. 17]
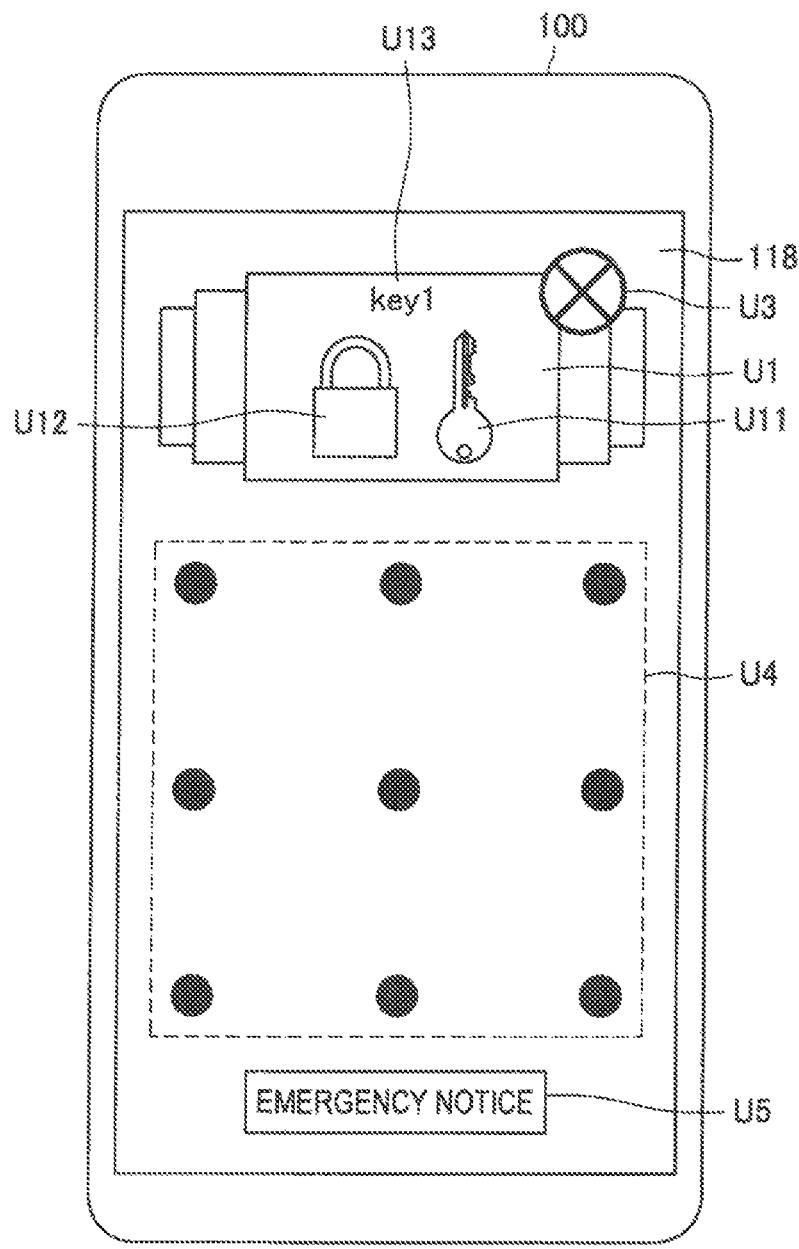

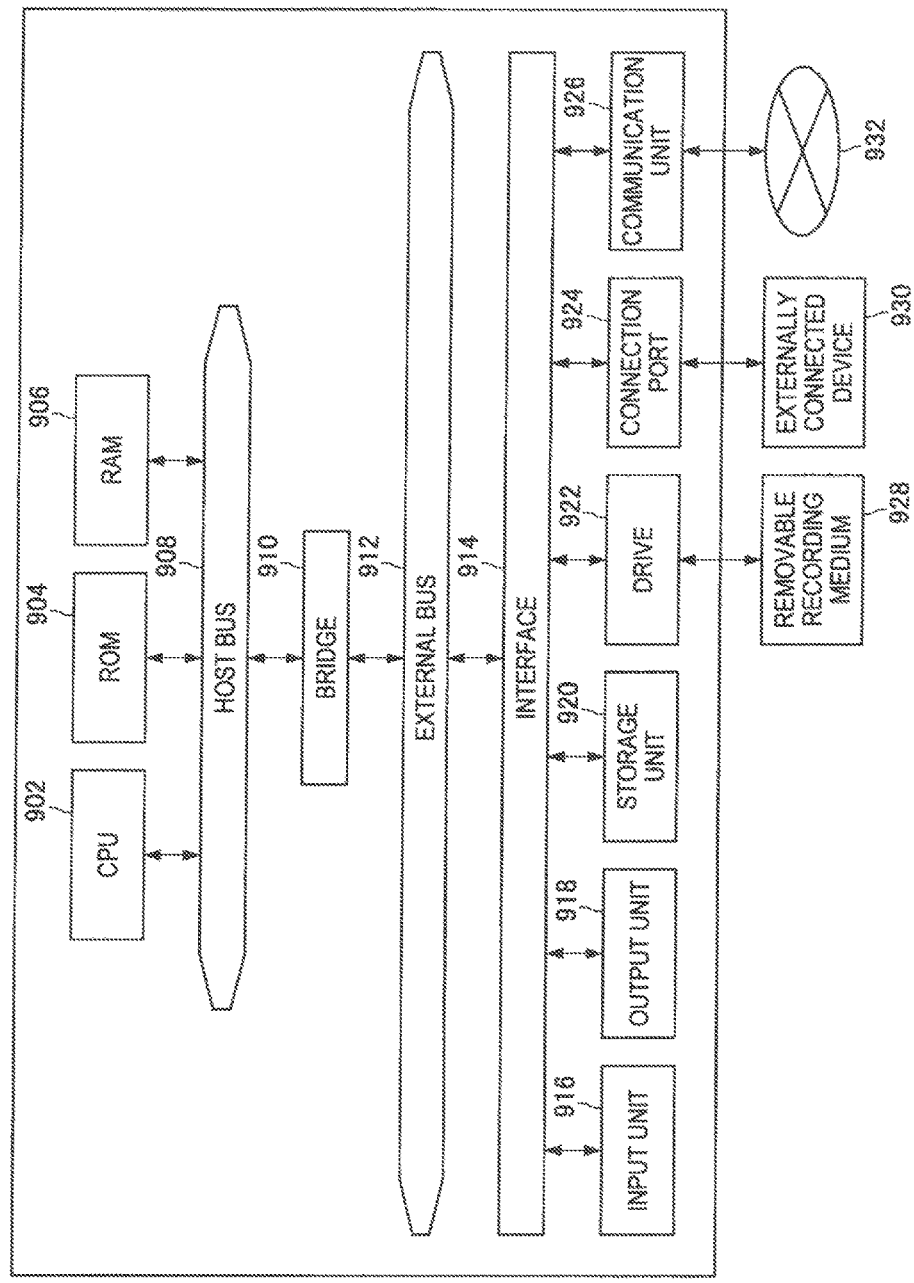
[Fig. 18]

[Fig. 19]
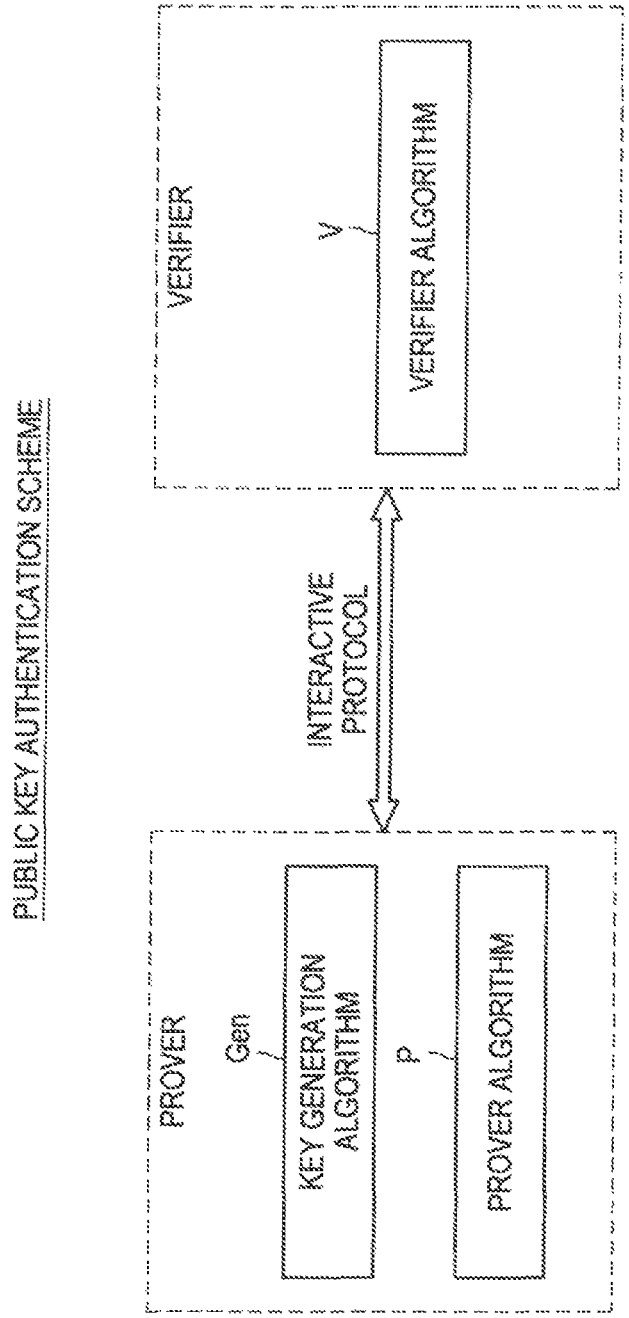

[Fig. 20]
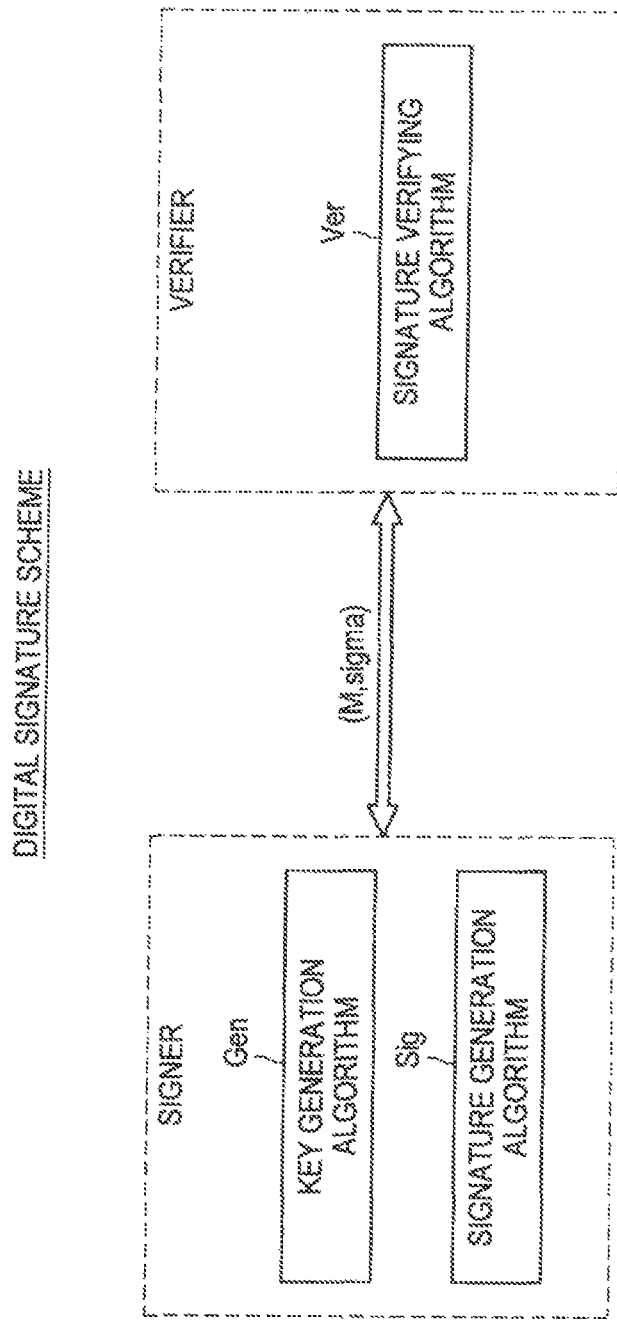

INFORMATION PROCESSING APPARATUS AND INFORMATION PROCESSING METHOD

CROSS REFERENCE TO RELATED APPLICATIONS

This application claims the benefit of Japanese Priority Patent Application JP 2013-162283 filed Aug. 5, 2013, the entire contents of which are incorporated herein by reference.

TECHNICAL FIELD

The present disclosure relates to an information processing apparatus, an information processing method, and a computer program.

BACKGROUND ART

Individual authentication methods can be classified into 3 kinds of authentications, i.e., authentication by knowledge, authentication by belongings, and authentication by biological information. The authentication by knowledge includes, for example, authentication by a password and the authentication by belongings includes, for example, authentication by a magnetic card with a magnetic stripe or an IC card with an IC chip. Also, the authentication by biological information includes authentication by a fingerprint, authentication by a vein, and authentication by as iris.

Also, in the authentication by belongings, there is a method in which a key apparatus including key information performs communication with another external apparatus for authentication. For example, PTL 1 discloses a technology for sharing a common personal identification number between an external apparatus and a key apparatus and performing unlocking or locking using the shared personal identification number.

CITATION LIST

Patent Literature

[PTL 1]
JP 3250355B

SUMMARY

Technical Problem

As one of the authentication schemes using key information, there is a public key authentication scheme or a signature scheme using a public key. However, the public key authentication scheme or the signature scheme using a public key is different from the above-described technology in that common key information is not shared between an external apparatus and a key apparatus, but two kinds of keys (a public key or a verification key and a secret key or a signature key) with different roles are used. However, when users do not correctly understand a method by which such two kinds of keys are used, there is a concern that a secret key (or a signature key) side may erroneously be transmitted to another external apparatus.

Accordingly, the present disclosure provides a novel and improved information processing apparatus, a novel and improved information processing method, and a novel and improved computer programs capable of visually indicating a difference between the roles of keys used in a public key authentication scheme or a signature scheme using a public key.

Solution to Problem

According to an embodiment of the present disclosure, there is provided an information processing system that includes circuitry that stores at least a secret key corresponding to a public key, and that causes display, on a screen, of first information corresponding to the public key and second information corresponding to the secret key stored.

According to an embodiment of the present disclosure, there is provided an information processing method that includes storing, with circuitry, at least a secret key corresponding to a public key, and displaying first information corresponding to the public key and second information corresponding to the secret key stored.

According to an embodiment of the present disclosure, there is provided a non-transitory computer-readable medium encoded with computer-readable instructions that, when executed by a computer, cause the computer to perform a method that includes storing at least a secret key corresponding to a public key, and displaying first information corresponding to the public key and second information corresponding to the secret key.

Advantageous Effects of Invention

According to the present disclosure described above, it is possible to provide a novel and improved information processing apparatus, a novel and improved information processing method, and a novel and improved computer program capable of visually indicating a difference between the roles of keys used in a public key authentication scheme or a signature scheme using a public key.

BRIEF DESCRIPTION OF DRAWINGS

FIG. 1 is an explanatory diagram illustrating an example of an overall configuration of an information processing system 1 according to an embodiment of the present disclosure.

FIG. 2 is an explanatory diagram illustrating an example of a functional configuration of a portable terminal 100 according to an embodiment of the present disclosure.

FIG. 3 is an explanatory diagram illustrating an example of a functional configuration of a PC 200 according to an embodiment of the present disclosure.

FIG. 4 is a flowchart illustrating an example of an operation of an information processing system 1 according to an embodiment of the present disclosure.

FIG. 5 is a flowchart illustrating an example of an operation of the information processing system 1 according to an embodiment of the present disclosure.

FIG. 6 is a flowchart illustrating an example of an operation of the portable terminal 100 according to an embodiment of the present disclosure.

FIG. 7 is a flowchart illustrating an example of an operation of the portable terminal 100 according to an embodiment of the present disclosure.

FIG. 8 is a an explanatory diagram illustrating a display example of information of the portable terminal 100.

FIG. 9 is an explanatory diagram illustrating a display example of information of the portable terminal 100.

FIG. 10 is an explanatory diagram illustrating a display example of information of the portable terminal 100.

FIG. 11 is an explanatory diagram illustrating a display example of information of the portable terminal 100.

FIG. 12 is an explanatory diagram illustrating a display example of information of the portable terminal 100.

FIG. 13 is an explanatory diagram illustrating a display example of information of the portable terminal 100.

FIG. 14 is an explanatory diagram illustrating a display example of information of the portable terminal 100.

FIG. 15 is an explanatory diagram illustrating a display example of information of the portable terminal 100.

FIG. 16 is an explanatory diagram illustrating a display example of information of the portable terminal 100.

FIG. 17 is an explanatory diagram illustrating a display example of information of the portable terminal 100.

FIG. 18 is an explanatory diagram illustrating an example of a hardware configuration.

FIG. 19 is an explanatory diagram summarizing algorithms for a public key authentication scheme.

FIG. 20 is an explanatory diagram summarizing algorithms for a digital signature scheme.

DESCRIPTION OF EMBODIMENTS

Hereinafter, preferred embodiments of the present disclosure will be described in detail with reference to the appended drawings. Also, throughout the present specification and the drawings, the same reference numerals are given to constituent elements having substantially the same functional configuration and the repeated description thereof will be omitted.

The description will be made in the following order.
<1. Background of the Present disclosure>
<2. Embodiment of the Present disclosure>
<Example of System Configuration>
<Example of Functional Configuration>
<Example of Operation>
<Display Example of Information>
<3. Example of Hardware Configuration>
<4. Conclusion>

1. BACKGROUND OF THE PRESENT DISCLOSURE

First, the background of the present disclosure will be mentioned before an embodiment of the present disclosure is described in detail. After the background of the present disclosure is mentioned, the embodiment of the present disclosure in relation to the background will be described in detail.

The technology disclosed in PTL 1 is a technology for sharing common key information (personal identification number) between an external apparatus and a key apparatus, and unlocking and locking the external apparatus using the shared personal identification number. Such a technology is easy for even a user having no technical knowledge of security to understand and facilitates the user's understanding of the meaning or use of key information.

Meanwhile, as another type of authentication scheme using key information, there is a public key authentication scheme and a signature scheme using a public key. The public key authentication scheme or the signature scheme using a public key is different from the above-described technology in that common key information is not shared between an external apparatus and a key apparatus, but two kinds of keys (a public key or a verification key and a secret key or a signature key) with different roles are used. When two kinds of keys are properly used in this way, an external apparatus can perform authentication using only a public key, and therefore it is possible to limit apparatuses retaining secret information (a secret key) to a smaller number. However, the public key authentication scheme or the signature scheme using a public key is difficult for a user having no technical knowledge to understand. This is because two kinds of keys with different roles are used.

The public key (or verification key) is information for verifying validity of authentication information exchanged between a key apparatus and an external apparatus. On the other hand, the secret key (or signature key) is information for generating authentication information exchanged between a key apparatus and an external apparatus. The secret key (or signature key) is information that is stored only by a key apparatus and is information that is not necessary for an external apparatus to share.

Accordingly, since there is a probability of the key apparatus or the key information being erroneously treated unless a way to use two kinds of keys is sufficiently understood, security of a key of user can be considered to be threatened. That is, there is a probability of information on a secret key (or a signature key) being erroneously registered at a place at which a public key (or a verification key) should be registered in an external apparatus at the time of key registration. Also, even when an authentication process is performed with an external apparatus, the secret key has to be used inside a key apparatus and does not have to be used outside the key apparatus excessively.

Accordingly, in an embodiment of the present disclosure to be described below, an information processing apparatus that indicates information enabling a user to visually understand a difference between the roles of a public key and a secret key and timings at which these keys are used will be described.

2. EMBODIMENT OF THE PRESENT DISCLOSURES

<Example of System Configuration>

First, an example of the configuration of an information processing system according to an embodiment of the present disclosure will be described with reference to the drawings. FIG. 1 is an explanatory diagram illustrating an example of the overall configuration of an information processing system 1 according to the embodiment of the present disclosure. Hereinafter, the example of the overall configuration of the information processing system 1 according to the embodiment of the present disclosure will be described with reference to FIG. 1.

As illustrated in FIG. 1, the information processing system 1 according to the embodiment of the present disclosure is configured to include a portable terminal 100 and a personal computer (PC) 200.

The information processing system 1 according to the embodiment of the present disclosure is a system that authenticates a user who attempts to use a service provided by the PC 200 according to a public key authentication scheme or a digital signature scheme when the user attempts to use the service. The portable terminal 100 is an apparatus that generates a pair of keys, i.e., a public key pk and a secret key sk. When the portable terminal 100 uses a service provided by the PC 200, the portable terminal 100 transmits only the public key pk between the generated pair of keys to the PC 200.

The portable terminal 100 can generate not only one pair of keys but also a plurality of pairs of keys. The portable terminal 100 can set respective different public keys pk in regard to a plurality of services for which authentication is gained by generating a plurality of pairs of keys.

The PC 200 is an apparatus that performs authentication according to a public key authentication scheme or a digital signature scheme. The PC 200 retains the public key pk generated by the portable terminal 100 and registered from the portable terminal 100 beforehand. Then, the PC 200 authenticates a user attempting to use a service using information generated based on the public key pk registered from the portable terminal 100 and the secret key sk corresponding to the public key pk generated by the portable terminal 100.

The service provided by the PC 200 may include, for example, login or unlocking of the PC 200, execution of an application installed in the PC 200, reproduction of contents (for example, music data, still image data, video data, or electronic book data) on the PC 200, or the like. A process of reproduction contents on the PC 200 can include, for example, a music or video reproduction process, an image display process, and an electronic book reproduction process. The user of the PC 200 can lock the login or unlocking of the PC 200, the execution of an application installed in the PC 200, the reproduction of the contents on the PC 200, or the like, as described above, with a key by generating a pair of keys, i.e., the public key pk and the secret key sk, with the portable terminal 100 and registering the public key pk in the PC 200. Then, when a service locked with the key is attempted to be performed, the PC 200 transmits an authentication request to the portable terminal 100 having the secret key sk corresponding to the public key set for the service and determines whether there is authority to perform the service based on a reply from the portable terminal 100.

The portable terminal 100 may be, for example, a device such as a smartphone, a table type terminal, a portable telephone, or a PHS or may be a wristwatch type device, a wristband type device, a finger ring type device, a glasses type device, any type of wearable device, or a key holder type device. Any type of device may be used as the portable terminal 100 as long as the device is able to generate and retain a pair of keys, i.e., the public key pk and the secret key sk, and communicate with the PC 200. The PC 200 may be, for example, a television, a smartphone, a tablet type terminal, a glasses type wearable device, a camera, a camcorder, a hard disk recorder, or a game device. Any type of device may be used as the PC 200 as long as the device can retain the public key pk and communicate with the portable terminal 100.

The communication between the portable terminal 100 and the PC 200 may be wired communication or may be wireless communication. In the following description, the communication between the portable terminal 100 and the PC 200 is assumed to be wireless communication unless otherwise specified. Also, in the wireless communication between the portable terminal 100 and the PC 200, for example, a wireless LAN, Bluetooth (registered trademark), ZigBee (registered trademark), or the like may be used.

The example of the overall configuration of the information processing system 1 according to the embodiment of the present disclosure has been described above with reference to FIG. 1. Next, an example of a functional configuration of the portable terminal 100 according to the embodiment of the present disclosure will be described.

<Example of Functional Configuration>

FIG. 2 is an explanatory diagram illustrating an example of the functional configuration of the portable terminal 100 according to the embodiment of the present disclosure. Hereinafter, the example of the functional configuration of the portable terminal 100 according to the embodiment of the present disclosure will be described with reference to FIG. 2.

As illustrated in FIG. 2, the portable terminal 100 according to the embodiment of the present disclosure is configured to include a control unit 102, a key generation unit 104, a key input unit 106, a key storage unit 108, a key selection unit 110, a key use-time notification unit 112, a key use permission state storage unit 114, a key use permission switch unit 116, a key information display unit 118, a reception unit 120, and a transmission unit 122.

The control unit 102 controls an operation of the portable terminal 100. That is, each of the constituent elements of the portable terminal 100 illustrated in FIG. 2 operates under the control of the control unit 102. Also, when an authentication request is transmitted from the PC 200, the control unit 102 performs a process of generating a reply to the authentication request using one secret key sk among secret keys sk stored in the key storage unit 108 to be described below.

The key generation unit 104 generates a pair of keys, a public key pk and a secret key sk. In the embodiment, a public key authentication scheme is not limited to a specific scheme. For example, the public key authentication scheme may use RSA cryptography or may use elliptic curve cryptography. Also, as will be described below in detail, a public key authentication scheme using multi-order multivariate simultaneous equations that are difficult to solve as a basis for security may be used, as disclosed in, for example, JP 2012-98690A.

The key input unit 106 allows the user of the portable terminal 100 to input a pair of keys, i.e., a public key pk and a secret key sk. In the public key authentication scheme using multi-order multivariate simultaneous equations that are difficult to solve as a basis for security, as disclosed in, for example, JP 2012-98690A described above, the length of a key for ensuring 80-bit security is only 80 bits. Accordingly, when the public key authentication scheme using multi-order multivariate simultaneous equations that are difficult to solve as a basis for security is used, the key input unit 106 can set key information having considerably high security, for example, by allowing the user to input information with a length equal to or less than 140 hits.

The key storage unit 108 stores the pair of keys, i.e., the public key pk and the secret key sk, generated by the key generation unit 104 or input by the key input unit 106. Of the pair of keys, i.e., the public key pk and the secret key sk, stored in the key storage unit 108, the public key pk can be transmitted from the transmission unit 112 to the PC 200 in order to lock the service provided by the PC 200 with the key. Since the secret key sk is stored in the key storage unit 108, the key storage unit 108 preferably has a tamper-resistant property.

The key selection unit 110 allows the user to decide which secret key sk enters a selection state among the secret keys sk stored in the key storage unit 108. When the key selection unit 110 causes one secret key sk to enter the selection state among the secret keys sk stored in the key storage unit 108, the portable terminal 100 can generate a reply to the authentication request from the PC 200 using the secret key sk having entered the selection state.

When the control unit 102 generates the reply to the authentication request from the PC 200 using one secret key sk among the secret keys sk stored in the key storage unit 108, the key use-time notification unit 112 performs notification of the use of the secret key sk by an image, audio, vibration, or the like under the control of the control unit 102.

The key use permission state storage unit 114 stores a use permission or non-permission state regarding each of the secret keys sk stored in the key storage unit 108. Also, the key use permission switch unit 116 switches the use permission or non-permission state stored by the key use permission state storage unit 114 and related to each of the secret keys sk stored in the key storage unit 108 based on a manipulation of the user of the portable terminal 100. Then, the key information display unit 118 displays the use permission or non-permission state stored by the key use permission state storage unit 114 and related to each of the secret keys sk stored in the key storage unit 108 or information regarding a key designated as being in the selection state using the key selection unit 110 by the user under the control of the control unit 102. In the embodiment, the description will be made assuming that the key information display unit 118 serves as, for example, a display installed in the portable terminal 100.

The key use permission switch unit 116 may switch the use permission or non-permission states of some or all of the secret keys sk stored in the key storage unit 108 en bloc. In this case, when use permission situations of all of the secret keys sk are different from a use permission situation of the individual secret keys sk, the key use permission switch unit 116 may prioritize use permission or non-permission of all of the secret keys sk or may prioritize use permission or non-permission of the individual secret keys sk.

The reception unit 120 receives information wirelessly transmitted from the PC 200. The information received from the PC 200 by the reception unit 120 includes, for example, a registration request of the public key pk in the PC 200 or an authentication request using the public key pk.

The transmission unit 122 wirelessly transmits information to the PC 200. The information transmitted to the PC 200 by the transmission unit 122 includes, for example, the public key pk in response to the registration request of the public key pk in the PC 200 or a reply generated by the control unit 102 in response to the authentication request using the public key pk.

Since the portable terminal 100 according to the embodiment of the present disclosure has the configuration illustrated in FIG. 2, the plurality of secret keys sk can be retained in the key storage unit 108. Also, since the portable terminal 100 according to the embodiment of the present disclosure has the configuration illustrated in FIG. 2, one secret key sk among the plurality of secret keys sk retained in the key storage unit 108 can be set to enter the selection state. Also, since the portable terminal 100 according to the embodiment of the present disclosure has the configuration illustrated in FIG. 2, the use permission or non-permission can be set in each of the plurality of the secret keys sk retained in the key storage unit 108 and the use permission or non-permission state thereof can be indicated.

The example of the functional configuration of the portable terminal 100 according to the embodiment of the present disclosure has been described above with reference to FIG. 2. Next, an example of a functional configuration of the PC 200 according to the embodiment of the present disclosure will be described.

FIG. 3 is an explanatory diagram, illustrating an example of a functional configuration of the PC 200 according to the embodiment of the present disclosure. Hereinafter, an example of the functional configuration of the PC 200 according to the embodiment of the present disclosure will be described with reference to FIG. 3.

As illustrated in FIG. 3, the PC 200 according to the embodiment of the present disclosure is configured to include a control unit 202, a public key storage unit 204, a verification result output unit 206, a transmission unit 208, and a reception unit 210.

The control unit 202 controls an operation of the PC 200. That is, each of the constituent elements of the PC 200 illustrated in FIG. 3 operates under the control of the control unit 202. Also, when an authentication request is transmitted from the PC 200 and a reply to the authentication request is transmitted from the portable terminal 100, the control unit 202 authenticates the portable terminal 100 transmitting the reply by verifying the reply.

The public key storage unit 204 stores the public key pk between the pair of keys, i.e., the public key pk and the secret key sk generated by the portable terminal 100. The public key pk generated by the portable terminal 100 is received by the reception unit 210 and is stored in the public key storage unit 204 by the control unit 202.

When the authentication request is transmitted from the PC 200 and a reply to the authentication request is transmitted from the portable terminal 100, the verification result output unit 206 outputs a verification result of the reply by an image, audio, vibration, or the like.

The transmission unit 208 wirelessly transmits information to the portable terminal 100. The information transmitted to the portable terminal 100 by the transmission unit 208 includes, for example, a registration request of the public key pk to the portable terminal 100 or the authentication request using the public key pk retained in the public key storage unit 204.

The reception unit 210 receives the information wirelessly transmitted from the portable terminal 100. The information received from the portable terminal 100 by the reception unit 210 includes, for example, the public key pk transmitted in response to the registration request of the public key pk in the PC 200 or a reply transmitted in response to the authentication request using the public key pk.

The example of the functional configuration of the PC 200 according to the embodiment of the present disclosure has been described above with reference to FIG. 3.

<Description of Public Key Authentication Scheme and Secret Key>

Next, the public key authentication scheme and the secret key will be described. The public key authentication scheme is an authentication scheme in which a certain person (prover) convinces another person (verifier) of her or his identity using the public key pk and the secret key sk. For example, a public key $pk_A$ of a prover A is published to a verifier. On the other hand, a secret key $sk_A$ of the prover A is managed secretly by the prover. According to the public key authentication scheme, a person who knows the secret key $sk_A$ corresponding to the public key $pk_A$ is regarded as the prover A herself or himself.

When the prover A proves her or his identity to a verifier B, the prover A may perform an interactive protocol with the verifier B and prove that she or he knows the secret key $sk_A$ corresponding to the public key $pk_A$. Furthermore, when the fact that the prover A knows the secret key skA is proved, to the verifier B according to the interactive protocol, validity (identity) of the prover A is proved.

Also, the following two conditions are necessary in order to ensure security of the public key authentication scheme.

The first condition is a condition that probability of falsification being established by a falsifier having no secret key sk be as small as possible when an interactive protocol is performed. The fact that the first condition is established is called "soundness." That is, in an interactive protocol having soundness, it can be otherwise said that there is no case in which falsification is established at a non-negligible probability by a falsifier having no secret key sk. The second condition is a condition that information regarding the secret key $sk_A$ possessed by the prover A not leak to the verifier B even when an interactive protocol is performed. The fact that the second condition is established is called a "zero-knowledge property."

By using an interactive protocol having the soundness and the zero-knowledge property described above, the security of the public key authentication scheme is ensured.

In a model of the public key authentication scheme, two entities, namely a prover and a verifier, are present, as shown in FIG. 19. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public key authentication scheme is configured from two entities, namely the prover and the verifier, and three algorithms, namely the key generation algorithm Gen, the prover algorithm P and the verifier algorithm V.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk is used to prove to the verifier of possession of the secret key sk corresponding to the public key pk by the prover. Formally, the key generation algorithm Gen is represented as formula (1) below as an algorithm that takes security parameter $1^{lambda}$ (lambda is an integer of 0 or more) as an input and outputs the secret key sk and the public key pk.

(Math 1)

$$(sk, pk) \leftarrow Gen(1^{lambda}) \quad (1)$$

(Prover Algorithm P)

The prover algorithm P is used by the prover. Furthermore, the prover algorithm P is an algorithm for proving that the prover possesses the secret key sk corresponding to the public key pk. The prover algorithm P is defined as an algorithm that takes the secret key sk and the public key pk of the prover as inputs and performs an interactive protocol with the verifier.

(Verifier Algorithm V)

The verifier algorithm V is used by a verifier. Furthermore, the prover algorithm V is an algorithm for verifying whether or not the prover possesses the secret key sk corresponding to the public key pk in an interactive protocol. The verifier algorithm V is defined as an algorithm that takes the public key pk of the prover as an input, and performs the interactive protocol with the prover, and subsequently outputs 0 or 1 (1 bit). Furthermore, the prover is assumed to be invalid when the output is 0 and the prover is assumed to be valid when the output is 1. Formally, the verifier algorithm V is represented as formula (2) below.

(Math 2)

$$0/1 \leftarrow V(pk) \quad (2)$$

As described above, in the public key authentication scheme, it is necessary to satisfy the two conditions, i.e., the soundness and the zero-knowledge property, in order to ensure security. However, in order to prove to the verifier that the prover possesses the secret key sk, it is necessary for the prover to perform a procedure dependent on the secret key sk, notify the prover of the result, and cause the verifier to perform verification based on the notification content. It is necessary to perform the procedure dependent on the secret key sk in order to guarantee the soundness. Meanwhile, even when the verifier is notified of the result of the procedure, it is necessary not to leak information regarding the secret key sk to the verifier at all. Therefore, it is necessary to design the key generation algorithm Gen, the prover algorithm P, and the verifier algorithm V described above so that such requisites are satisfied.

Next, algorithms for a digital signature scheme will be summarized. FIG. 20 is an explanatory diagram summarizing algorithms for a digital signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is digital signatures. A digital signature refers to a setup that associates given data with signature data known only to the creator of the data, provides the signature data to a recipient, and verifies that signature data on the recipient's end.

(Model)

As illustrated in FIG. 20, the two identities of signer and verifier exist in a model of a digital signature scheme. In addition, the model of a digital signature scheme is made up of three algorithms: a key generation algorithm Gen, a signature generation algorithm Sig, and a signature verifying algorithm Ver.

The signer uses the key generation algorithm Gen to generate a paired signature key sk and verification key pk unique to the signer. The signer also uses the signature generation algorithm Sig to generate a digital signature sigma to attach, to a message M. In other words, the signer is an entity that attaches a digital signature sigma to a message M. Meanwhile, the verifier uses the signature verifying algorithm Ver to verify the digital signature attached to the message M. In other words, the verifier is an entity that verifies the digital signature sigma in order to confirm whether or not the creator of the message M is the signer.

Note that although the terms "signer" and "verifier" are used in the description hereinafter, these terms ultimately mean entities. Consequently, the agent that executes the key generation algorithm Gen and the signature generation algorithm Sig is an information processing apparatus corresponding to the "signer" entity. Similarly, the agent that executes the signature verifying algorithm Ver is an information processing apparatus.

(Key Generation Algorithm Gen)

The key generation algorithm Gen is used by the signer. The key generation algorithm Gen is an algorithm that generates a paired signature key sk and verification key pk unique to the signer. The verification key pk generated by the key generation algorithm Gen is made public. Meanwhile, the signer keeps the signature key sk generated by the key generation algorithm Gen a secret. The signature key sk is then used to generate digital signature sigma to attach to a message M. For example, the key generation algorithm Gen accepts a security parameter $1^p$ (where p is an integer equal to or greater than 0) as input, and outputs a signature key sk and a verification key pk. In this case, the key generation algorithm Gen may be expressed formally as in the following formula (3).

(Math 3)

$$(sk, pk) \leftarrow \text{Gen}(1^{lambda}) \quad (3)$$

(Signature Generation Algorithm Sig)

The signature generation algorithm Sig is used by the signer. The signature generation algorithm Sig is an algorithm that generates a digital signature sigma to be attached to a message M. The signature generation algorithm Sig is an algorithm that accepts a signature key sk and a message M as input, and outputs a digital signature sigma. The signature generation algorithm Sig may be expressed formally as in the following formula (4).

(Math 4)

$$\text{sigma} \leftarrow \text{Sig}(sk, M) \quad (4)$$

(Signature Verifying Algorithm Ver)

The signature verifying algorithm Ver is used by the verifier. The signature verifying algorithm Ver is an algorithm that verifies whether or not the digital signature sigma is a valid digital signature for the message M. The signature verifying algorithm Ver is an algorithm that accepts a signer's verification key pk, a message M, and a digital signature sigma as input, and outputs 0 or 1 (1 bit). The signature verifying algorithm Ver may be expressed formally as in the following formula (5). At this point, the verifier decides that the digital signature sigma is invalid in the case where the signature verifying algorithm Ver outputs 0 (the case where the verification key pk rejects the message M and the digital signature sigma), and decides that the digital signature sigma is valid in the case where the signature verifying algorithm Ver outputs 1 (the case where the verification key pk accepts the message M and the digital signature sigma).

(Math 5)

$$0/1 \leftarrow \text{Ver}(pk, M, \text{sigma}) \quad (5)$$

In the present disclosure, neither the public key authentication scheme nor the digital signature scheme is limited to a specific scheme. For example, the public key authentication scheme or the digital signature scheme may use RSA cryptography or may use elliptic curve cryptography. Also, the public key authentication scheme or the digital signature scheme using multi-order multivariate simultaneous equations that are difficult to solve as a basis for security may be used, as disclosed in, for example, JP 2012-98690A. The function used in the foregoing document is a function formed by m n-variable quadratic polynomials (where both of m and n are integers of 2 or more).

For example, in order to ensure 80-bit security, a key length of 1024 bits is necessary in the case of the RSA cryptography and a key length of 160 bits is necessary even in the case of ECDSA. Meanwhile, in the above-described case of the public key authentication scheme using multi-order multivariate simultaneous equations that are difficult to solve as a basis for security, the length of a key for ensuring 80-bit security is only 80 bits. Accordingly, when a user attempts to register a public key or receive authentication using a secret key in a service such as a web service, it is more preferable to use the above-described public key authentication scheme using multi-order multivariate simultaneous equations that are difficult to solve as a basis for security and in which the number of characters input by the user is small.

When the public key authentication scheme or the digital signature scheme using multi-order multivariate simultaneous equations that are difficult to solve as a basis for security, as disclosed in, for example, JP 2012-98690A, is used, the size of a public key is decreased. Therefore, it is possible to expect the advantageous effect of reducing trouble in terms of administration or management and an improvement in a long-term security level. For example, in terms of the administration, it is possible to expect the advantageous effects of decreasing the restriction on display of the public key and shortening a length which can be input and transmitted. Also, in terms of the management since the size of a public key is small, it is possible to expect the advantageous effects of reducing the size of a database and setting a key only through a copy manipulation of a text string. Furthermore, in terms of security, it is possible to expect long-term security because of a scheme dependent on mathematically difficult problems.

<Example of Operation>

Next, an example of an operation of the information processing system 1 according to the embodiment of the present disclosure will be described. FIG. 4 is a flowchart illustrating the example of the operation of the information processing system case 1 according to the embodiment of the present disclosure. The flowchart illustrated in FIG. 4 shows an operation of transmitting a key registration request from the PC 200 to the portable terminal 100, generating keys by the portable terminal 100, and transmitting a public key pk from the portable terminal 100 to the PC 200. Hereinafter, an example of an operation of the information processing system 1 according to the embodiment of the present disclosure will be described with reference to FIG. 4.

When the PC 200 requests key registration from the portable terminal 100, the control unit 202 first performs a key registration request transmission process (step S101). The key registration request transmission, process can be performed in various settings. For example, when the user of the PC 200 attempts to register the public key pk in the PC 200, the user manipulates the FC 200 to perform the key registration request transmission process.

When the key registration request transmission process is performed in the foregoing step S101, the PC 200 subsequently transmits the key registration request wirelessly from the transmission unit 208 to the portable terminal 100 (step S102). When the reception unit 120 of the portable terminal 100 receives the key registration request wirelessly transmitted from the transmission unit 208 in step S102, the portable terminal 100 performs a process at the time of the reception of the key registration request along with the reception of the key registration request (step S103).

The process at the time of the reception of the key registration request in step S103 can include a process of generating a pair of keys, i.e., the public key pk and the secret key sk, or a process of causing the user to input the public key pk and the secret key sk. The process of generating a pair of keys, i.e., the public key pk and the secret key sk, can be performed by, for example, the key generation unit 104 and the process of causing the user to input the public key pk and the secret key sk can be performed by the key input unit 106.

When the process at the time of the reception of the key registration request is performed in the foregoing step S103, the portable terminal 100 subsequently transmits a reply to the key registration request wirelessly from the transmission unit 122 to the PC 200 (step S104). The reply to the key registration request wirelessly transmitted from the transmission unit 122 in step S104 includes the public key pk generated in the foregoing step S103.

When the PC 200 receives the reply to the key registration request wirelessly transmitted from the portable terminal 100 in the foregoing step S104, the PC 200 registers the public key pk included in the reply (step S105). The registration of the public key pk in step S105 can be performed by the control unit 202. Also, the public key pk received by the PC 200 is stored in the public key storage unit 204.

The portable terminals 100 and the PC 200 operate, as illustrated in FIG. 4, such that the key registration request can be transmitted front the PC 200 to the portable terminal 100, the keys can be generated by the portable terminal 100, and the public key pk can be transmitted from the portable terminal 100 to the PC 200. Also, the PC 200 can operate, as illustrated in FIG. 4, to store the public key pk transmitted from the portable terminal 100.

The example of the operation of the information processing system 1 according to the embodiment of the present disclosure has been described above with reference to FIG. 4. Next, an example of an authentication process using the public key pk stored in the PC 200 will be described.

FIG. 5 is a flowchart illustrating an example of an operation of the information processing system 1 according to the embodiment of the present disclosure. The flowchart illustrated in FIG. 5 is an example of an authentication process using the public key pk stored in the PC 200. Hereinafter, the example of the operation of the information processing system 1 according to the embodiment of the present disclosure will be described with reference to FIG. 5.

When the PC 200 performs the authentication process using the public key pk, the control unit 202 first performs an authentication request transmission process (step S111). The authentication request transmission process can be performed in various settings. The authentication request transmission process can be performed, for example, when the user of the PC 200 attempts to log in to the PC 200, the user attempts to unlock the PC 200, the user executes an application installed in the PC 200, the user performs any process using an application installed in the PC 200, and the user attempts to reproduce content an the PC 200. The process using an application installed in the PC 200 can include, for example, a process of attempting to access a specific page using a web browser and a process of editing a document using document generation software. Also, the process of reproducing content on the PC 200 can include, for example, a music or moving image reproduction process, an image display process, and an electronic book reproduction process.

When the authentication request transmission process is performed in the foregoing step S111, the PC 200 subsequently transmits an authentication request wirelessly from the transmission unit 208 to the portable terminal 100 (step S112). When the reception unit 120 of the portable terminal 100 receives the authentication request wirelessly transmitted from the transmission unit 208 in step S112, the portable terminal 100 performs a process at the time of the reception of the authentication request along with the reception of the authentication request (step S113).

Here, information transmitted from the PC 200 to the portable terminal 100 in the foregoing step S112 can include, for example, a challenge generated in the PC 200 at the time of the authentication of a challenge response scheme using a public key authentication scheme. In addition, the process at the time of the reception of the authentication request in step S113 includes a process of generating a response to the challenge transmitted from the PC 200 by the control unit 102 using the secret key sk stored in the key storage unit 108.

When the PC 200 transmits the authentication request in the foregoing step S112, predetermined signature information may be added to the challenge and may be transmitted. For example, a date and a time at which the challenge is generated may be used as the predetermined signature information. When the PC 200 adds the predetermined signature information to the challenge and transmits the challenge, the portable terminal 100 can be caused to reply a response including the signature information. Then, the PC 200 can determine whether or not the challenge is the challenge generated by the self-PC 200 by confirming the signature information included in the response.

When the process at the time of the reception of the authentication request is performed in the foregoing step S113, the portable terminal 100 subsequently transmits the reply to the authentication request wirelessly from the transmission unit 122 to the PC 200 (step S114). The reply wirelessly transmitted from the transmission unit 122 in step S114 and made to the authentication request includes the response to the challenge generated in the foregoing step S113.

When the PC 200 receives the reply to the authentication request wirelessly transmitted from the portable terminal 100 in the foregoing step S114, the PC 200 performs the authentication process using the response included in the reply (step S115). The authentication process of step S115 can be performed by the control unit 202. In addition, the authentication process of step S115 is performed by determining whether or not the response included in the reply from the portable terminal 100 is a correct answer value.

When interactions greater than one round trip are necessary in the authentication process, the authentication process is performed in step S115 and the PC 200 subsequently performs a predetermined authentication protocol necessary between the PC 200 and the portable terminal 100 (step S116). The authentication protocol may be performed as necessary, and may not necessarily be performed, for example, when the authentication process is completed by one round trip in the authentication protocol.

The transmission of the challenge from the PC 200 to the portable terminal 100 or the transmission of the response to the challenge from the portable terminal 100 to the PC 200, as described above, may be performed a plurality of times. By transmitting the challenge and the response a plurality of times, it is possible to improve security of the authentication according to the public key authentication scheme.

The example of the operation of the information processing system 1 according to the embodiment of the present disclosure has been described above with reference to FIG. 5. Next, the process at the time of the reception of the key registration request in the portable terminal 100 in the foregoing step S103 will be described in more detail.

FIG. 6 is a flowchart illustrating an example of an operation of the portable terminal 100 according to the embodiment of the present disclosure. The flowchart illustrated in FIG. 6 shows the details of the process at the time of the reception of the key registration request in the portable terminal 100 in step S103 of FIG. 4. Hereinafter, an example of the operation of the portable terminal 100 according to the embodiment of the present disclosure will be described with reference to FIG. 6.

When the reception unit 120 receives the key registration request wirelessly transmitted from the PC 200 (step S121), the portable terminal 100 determines whether or not the key is designated in the key registration request (step S122). The determination of step S122 can be performed by, for example, the control unit 102.

When the key is designated in the key registration request as the determination result of the foregoing step S122, the portable terminal 100 subsequently determines whether or not the designated key is in an automatic reply state (step S123). The determination of step S123 can be performed by, for example, the control unit 102. In the embodiment, the fact that the key is in the automatic reply state is assumed to specify that the request from the PC 200 is not confirmed by the user and setting is stored in the key storage unit 108 such that a reply using the key is given from the portable terminal 100 to the PC 200.

When it is determined in the foregoing step S123 that the designated key is in the automatic reply state, the portable terminal 100 subsequently performs a process of replying to the key registration request (step S131). That is, the portable terminal 100 performs a process of registering the key (public key) designated by the key registration request from the PC 200 in the PC 200. The process of step S131 can be performed by, for example, the control unit 102. Conversely, when it is determined in the foregoing step S123 that the designated key is not in the automatic reply state, the portable terminal 100 subsequently causes the pair of keys designated by the key registration request from the PC 200 to enter the selection state (step S124). The process of step S124 can be performed by causing the control unit 102 to control the key selection unit 110. When the process of step S124 ends, the portable terminal 100 causes the process to proceed to a process of step S128 to be described below.

Also, when the key is not designated by the key registration request as the determination result of the foregoing step S122, the portable terminal 100 subsequently determines whether or not there are the keys currently in the selection state (step S125). The determination of step S125 can be performed by, for example, the control unit 102. In the embodiment, the fact that the keys are in the selection state is assumed, for example, to specify that the key selection unit 110 selects one pair of keys among the pairs of keys stored in the key storage unit 108 through a manipulation or the like of the user.

When it is determined in the foregoing step S125 that there are no keys currently in the selection state, the portable terminal 100 subsequently causes a pair of keys which are not in the automatic reply state to enter the selection state (step S126). The process of step S126 can be performed by, for example, the key selection unit 110. For example, when two pairs A and B of keys are stored in the key storage unit 108 and the pair B of keys is in the automatic reply state, the portable terminal 100 causes the pair A of keys which is not in the automatic reply state to enter the selection state. Also, when any pair of keys is in the automatic reply state, the portable terminal 100 may perform a process of displaying a message to confirm with the user which keys will be caused to enter the selection state in step S126. When the process of step S126 ends, the portable terminal 100 causes the process to proceed to a process of step S128 to be described below.

Conversely, when it is determined in the foregoing step S125 that there are the keys currently in the selection state, the portable terminal 100 subsequently determines whether the keys in the selection state are in the automatic reply state (step S127). The determination of step S127 can be performed by, for example, the control unit 102.

When it is determined in the foregoing step S127 that the keys in the selection state are not in the automatic reply state, the portable terminal 100 subsequently performs a process of emphasizing and displaying the public key of the pair of keys in the selection state (step S128). The process of emphasizing and displaying the public key in step S128 can be performed by, for example, the control unit 102. Also, an example of the process of emphasizing and displaying the public key will be described below in detail.

When the process of emphasizing and displaying the public key is performed in step S128 and the user performs a manipulation of selecting the public key (step S129), the portable terminal 100 performs a process of displaying a message to confirm with the user whether or not the public key should be registered in the PC 200 (step S130). The display process of step S130 can be performed by, for example, the control unit 102.

Then, when the user decides to register the public key in the PC 200 through the manipulation in response to the foregoing message, the portable terminal 100 performs a process of replying to the key registration request from the PC 200 (step S131). That is, the portable terminal 100 performs a process of registering the public key in the PC 200. The replying process of step S131 can be performed by, for example, the control unit 102.

Conversely, when it is determined in the foregoing step S127 that the keys in the selection state are in the automatic reply state, the portable terminal 100 subsequently skips the processes of the foregoing steps S128 to S130 and performs the process of replying to the key registration request from the PC 200 (step S131).

The process at the time of the reception of the key registration request in the portable terminal 100 has been described above. The portable terminal 100 according to the embodiment can reply to the key registration request from the PC 200 by performing the processes illustrated in FIG. 6. In addition, the portable terminal 100 according to the embodiment can indicate the public key so that the user can easily know that the public key is used at the time of the reception of the key registration request by emphasizing and displaying the public key in step S128 of FIG. 6.

Next, the process at the time of the reception of the authentication request in the portable terminal 100 will be described in detail.

FIG. 7 is a flowchart illustrating an example of an operation of the portable terminal 100 according to the embodiment of the present disclosure. The flowchart illustrated in FIG. 7 shows the details of the process at the time of the reception of the authentication request in the portable terminal 100 in step S113 of FIG. 5. Hereinafter, the example of the operation of the portable terminal 100 according to the embodiment of the present disclosure will be described with reference to FIG. 7.

When the reception unit 120 receives the authentication request wirelessly transmitted from the PC 200 (step S141), the portable terminal 100 determines whether or not the key is designated in the authentication request (step S142). The determination of step S142 can be performed by, for example, the control unit 102.

When it is determined in the foregoing step S142 that the key is designated in the authentication request, the portable terminal 100 subsequently determines whether or not the designated key is in the automatic reply state (step S143). The determination of step S143 can be performed by, for example, the control unit 102.

When it is determined in the foregoing step S143 that the designated key is in the automatic reply state, the portable terminal 100 subsequently performs a process of replying to the authentication request (step S151). That is, the portable terminal 100 performs a process of generating a response to a challenge using the key (secret key) designated in the authentication request from the PC 200 and transmitting the generated response to the PC 200. The process of step S151 can be performed by, for example, the control unit 102. Conversely, when it is determined in the foregoing step S143 that the designated key is not in the automatic reply state, the portable terminal 100 subsequently causes the pair of keys designated by the authentication request from the PC 200 to enter the selection state (step S144). The process of step S144 can be performed by causing the control unit 102 to control the key selection unit 110. When the process of step S144 ends, the portable terminal 100 causes the process to proceed to a process of step S148 to be described below.

Also, when it is determined in the foregoing step S142 that the key is not designated by the authentication request, the portable terminal 100 subsequently determines whether or not there are the keys currently in the selection state (step S145). The determination of step S145 can be performed by, for example, the control unit 102.

When it is determined in the foregoing step S145 that there are no keys currently in the selection state, the portable terminal 100 subsequently cause a pair of keys which are not in the automatic reply state to enter the selection state (step S146). The process of step S146 can be performed by, for example, the key selection unit 110. Also, when any pair of keys is in the automatic reply state, the portable terminal 100 may perform a process of displaying a message to confirm with the user which keys will be caused to enter the selection state in step S146. When the process of step S146 ends, the portable terminal 100 causes the process to proceed to a process of step S148 to be described below.

Conversely, when it is determined in the foregoing step S145 that there are the keys currently in the selection state, the portable terminal 100 subsequently determines whether the keys in the selection state are in the automatic reply state (step S147). The determination of step S147 can be performed by, for example, the control unit 102.

When it is determined in the foregoing step S147 that the keys in the selection state are not in the automatic reply state, the portable terminal 100 subsequently performs a process of emphasizing and displaying the secret key of the pair of keys in the selection state (step S148). The process of emphasizing and displaying the secret key in step S148 can be performed by, for example, the control unit 102. Also, an example of the process of emphasizing and displaying the secret key will be described below in detail.

When the process of emphasizing and displaying the secret key is performed in step S148 and the user performs a manipulation of selecting the secret key (step S149), the portable terminal 100 performs a process of displaying a message to confirm with the user whether or not to make a reply to the PC 200 using the secret key (step S150). The display process of step S150 can be performed by, for example, the control unit 102.

Then, when the user decides to make the reply to the PC 200 using the secret key through a manipulation in response to the foregoing message, the portable terminal 100 performs a process of replying to the authentication request from the PC 200 (step S151). That is, the portable terminal 100 performs a process of generating the response to the challenge using the secret key and transmitting the generated response to the PC 200. The replying process of step S151 can be performed by, for example, the control unit 102.

Conversely, when it is determined in the foregoing step S147 that the keys in the selection state are in the automatic reply state, the portable terminal 100 subsequently skips the processes of the foregoing steps S148 to S150 and performs the process of replying to the authentication request from the PC 200 (step S151).

The process at the time of the reception of the authentication request in the portable terminal 100 has been described above. The portable terminal 100 according to the embodiment can reply to the authentication request from the PC 200 by performing the processes illustrated in FIG. 7. In addition, the portable terminal 100 according to the embodiment can indicate the secret key so that the user can easily know that the secret key is used at the lime of the reception of the authentication request by emphasizing and displaying the secret key in step S148 of FIG. 7.

<Display Example of Information>

Next, an example of information displayed on the key information display unit 118 by the portable terminal 100 will be described.

FIG. 8 is an explanatory diagram illustrating an example of the information displayed on the key information display unit 118 by the portable terminal 100. FIG. 8 shows an example of a state in which a pair of keys is displayed on the key information display unit 118 when the user of the portable terminal 100 performs a predetermined manipulation.

FIG. 8 shows an example in which a key pair display region U1 and a key information display region U2 indicating which pair of keys are displayed on the key information display unit 118 are shown. The key pair display region U1 is a region that displays a pair of keys currently in the selection state. Also, FIG. 8 shows an example in which secret key information U11, public key information U12, and a key name U13 are displayed on the key information display unit 118. As illustrated in FIG. 8, the secret key information U11, the public key information U12, and the key name U13 are displayed in the key pair display region U1, and thus respective information regarding a pair of keys in the selection state is displayed. Also, FIG. 8 shows an example in which the current pair of keys is surrounded by a circle in the key information display region U2.

The portable terminal 100 operates such that the pair of keys displayed in the key pair display region U1 is switched through a swiping manipulation (a sliding manipulation with a finger touching a screen) of the user on the key pair display region U1. Also, the portable terminal 100 operates such that information regarding the secret key corresponding to the secret key information U11 and information regarding the public key corresponding to the public key information U12 are displayed on the key information display unit 118 through a touch manipulation of the user on the secret key information U11 and the public key information U12. Also, the portable terminal 100 operates such that the user can select a manipulation such as deletion of the public key or the secret key, change in a sequence, change in a name, change in an image, or output to an external apparatus through a long-pressing manipulation of the user on the secret key information U11 and the public key information U12.

Also, in the example illustrated in FIG. 8, the public key information U12 is shown as an image of a padlock and the secret key information U11 is shown as an image of a key for unlocking the padlock. It is needless to say that the information displayed as the secret key information U11 and the public key information U12 is not limited to the related examples.

When a new pair of keys are added, the portable terminal 100 may allow the user to perform a manipulation of adding, for example, a new tab (board). Furthermore, a new pair of keys may be generated inside the portable terminal 100, may be imported from another apparatus, or may be manually input by the user.

When information is displayed on the key information display unit 118 as in FIG. 8 and a setting in which the public key is used is shown, the portable terminal 100 performs a predetermined emphasis and display process on the public key information U12 displayed in the key pair display region U1.

FIG. 9 is an explanatory diagram illustrating an example of information displayed on the key information display unit 118 by the portable terminal 100. FIG. 9 shows an example in which a setting (for example, when a public key registration request is received from the PC 200) in which the public key is used is shown and the public key information U12 displayed in the key pair display region U1 is emphasized and displayed.

For example, when the process of emphasizing and displaying the public key of step S128 in FIG. 6 is performed, the portable terminal 100 performs a process of emphasizing and displaying the public key information U12 displayed in the key pair display region U1, as illustrated in FIG. 9. In the example illustrated in FIG. 9, by expanding and displaying the image of the padlock displayed as the public key information U12 and contracting and displaying the image of the key displayed as the secret key information U11, the public key information U12 is relatively emphasized. Also, in the example illustrated in FIG. 9, the periphery of the image of the padlock displayed as the public key information U12 is displayed so that the periphery of the image of the padlock is brightened.

When a setting in which the public key is used is shown, for example, the public key registration request is received from the PC 200, the portable terminal 100 according to the embodiment performs a process of emphasizing and displaying the public key information U12 displayed in the key pair display region U1, as illustrated in FIG. 9. By emphasizing and displaying the public key information U12 in this way, the portable terminal 100 according to the embodiment can indicate the public key so that the user can easily know that the public key is used in the setting in which the public key is used.

Also, when a setting in which the public key is used is shown, the portable terminal 100 according to the embodiment may display the name of a target apparatus or service for which the public key is used, on the key information display unit 118. FIG. 9 shows an example in which the portable terminal 100 displays the name of a target web service for which the public key is registered in a name display region U14. Also, FIG. 9 shows an example in which the portable terminal 100 displays a block arrow oriented from the public key information U12 to the name display region U14 on the key information display unit 118. The portable terminal 100 can display such a block arrow to indicate to the user that the public key is registered in the web service.

As illustrated in the flowchart of FIG. 6 described above, when the key is designated from the PC 200 and the key registration request is given, the portable terminal 100 causes the pair of keys to enter the selection state in response to the request and then performs the foregoing emphasis and display process.

When the information is displayed on the key information display unit 118 as in FIG. 8 and a setting in which the secret key is used is shown, the portable terminal 100 performs a predetermined emphasis and display process on the secret key information U11 displayed in the key pair display region U1.

FIG. 10 is an explanatory diagram illustrating as example of information displayed on the key information display unit 118 by the portable terminal 100. FIG. 10 shows an example in which a setting (for example, when an authentication request is received from the PC 200) in which the secret key is used is shown and the secret key information U11 displayed in the key pair display region U1 is emphasized and displayed.

For example, when the process of emphasizing and displaying the secret key in step S148 of FIG. 7 is performed, the portable terminal 100 performs a process of emphasizing and displaying the secret key information U11 displayed in the key pair display region U1, as illustrated in FIG. 10. In the example illustrated in FIG. 10, by expanding and displaying the image of the key displayed as the secret key information U11 and contracting and displaying the image of the padlock displayed as the public key information U12, the secret key information U11 is relatively emphasized. Also, in the example illustrated in FIG. 10, the periphery of the image of the key displayed as the secret key information U11 is displayed so that the periphery of the image of the key is brightened.

When a setting in which the secret key is used is shown, for example, a authentication request is received from the PC 200 and a response to a challenge is generated using the secret key, the portable terminal 100 according to the embodiment performs a process of emphasizing and displaying the secret key information U11 displayed in the key pair display region U1, as illustrated in FIG. 10. By emphasizing and displaying the secret key information U11 in this way, the portable terminal 100 according to the embodiment can indicate the secret key so that the user can easily know that the secret key is used in the situation in which the secret key is used.

Also, when a setting in which the secret key is used is shown, the portable terminal 100 according to the embodiment may display the name of a target apparatus or service for which the secret key is used on the key information display unit 118. FIG. 10 shows an example in which the portable terminal 100 displays the name of a target web service for which the secret key is used in a name display region U15. Also, FIG. 10 shows an example in which the portable terminal 100 displays a block arrow oriented from the name display region U15 to the secret key information U11 on the key information display unit 118. The portable terminal 100 can display such a block arrow to indicate to the user that a request to generate the response using the secret key is given from the web service. Also, the portable terminal 100 can display such a block arrow to cause the user to visually understand that the secret key itself is not transmitted to the service.

Also, the portable terminal 100 may express the settings in which the public key is used and the situation in which the secret key is used in different emphatic manners at the time of the emphasis and display. For example, the portable terminal 100 may express these settings in different emphatic manners by displaying the colors of the peripheries of the images with different colors at the time of the emphasis and display. Thus, the portable terminal 100 can cause the user to visually understand that the public key itself is transmitted in the setting in which the public key is used, but the secret key itself is not transmitted in the setting in which the secret key is used.

Other display examples in the setting in which the secret key is used will be described. FIG. 11 is an explanatory diagram illustrating an example of information displayed on the key information display unit 118 by the portable terminal 100. FIG. 11 shows an example in which a setting (for example, when an authentication request is received from the PC 200) in which the secret key is used is shown and the secret key information U11 displayed in the key pair display region U1 is emphasized and displayed.

In the example of FIG. 11, the portable terminal 100 displays an arrow oriented from the secret key information U11 to the public key information U12. This means that an authentication request is received from the PC 200 and the user is requested to perform a manipulation of sliding the secret key information U11 to the public key information U12, that is an action of inserting the key into the padlock, in order to generate a response to a challenge.

By displaying the arrow on the key information display unit 118, as illustrated in FIG. 11, the portable terminal 100 can inform the user that the secret key is not transmitted to the outside since the key is merely inserted into the padlock without flying out of the screen to generate the response to the challenge.

Also, the portable terminal 100 may cause the user to perform a predetermined manipulation of giving a use permission of the secret key so that none may use the secret key without permission, before the user is caused to perform the manipulation of sliding the secret key information U11 to the public key information U12, that is, the action of inserting the key into the padlock.

FIG. 12 is an explanatory diagram illustrating an example of information displayed on the key information display unit 118 by the portable terminal 100. FIG. 12 shows an example in which a setting (for example, when an authentication request is received from the PC 200) in which the secret key is used is shown and the secret key information U11 displayed in the key pair display region U1 is emphasized and displayed.

FIG. 12 shows as example of information displayed on the key information display unit 118 by the portable terminal 100 when a manipulation of tracking a specific pattern which the portable terminal 100 causes the user to register in advance is performed as a predetermined manipulation of giving secret key use permission to the user. FIG. 12 shows an example in which an unlocking manipulation region U16 is displayed on the key information display unit 118 to cause the user to perform the manipulation.

The portable terminal 100 gives secret key use permission, that is, permits the user to perform a manipulation of sliding the secret key information U11 to the public key information U12 only when the manipulation of the user on the lock releasing manipulation region U16 is a manipulation of tracing a specific pattern which the user is caused to register in advance. When such a manipulation is performed, the portable terminal 100 can apply a limitation such that none may use the secret key without permission.

Also, when the key designated from the PC 200 in the selection state is in the automatic reply state, the portable terminal 100 displays information indicating that the key is in the automatic reply state on the key information display unit 118. A display example of the information indicating that the key is in the automatic reply state will be described.

FIG. 13 is an explanatory diagram illustrating an example of the information displayed on the key information display unit 118 by the portable terminal 100. FIG. 13 shows a display example of the information on the key information display unit 118 when the key designated from the PC 200 or in the selection state is in the automatic reply state.

For example, when a public key is registered, if a pair of keys designated from the PC 200 or in the selection state are in the automatic reply state, the portable terminal 100 displays an image representing a state in which the padlock is unlocked as public key information U12, as illustrated in FIG. 13. By displaying the image representing the state in which the padlock is unlocked as the public key information U12 in this way, the portable terminal 100 can visually indicate to the user that the pair of keys are in the automatic reply state.

In FIG. 13, when the pair of keys are in the automatic reply state, the portable terminal 100 displays the image representing the state in which the padlock is unlocked as the public key information U12. However, embodiments of the present disclosure are not limited to the related examples. For example, when the public key information U12 is displayed as a text string indicating a public key, the portable terminal 100 may change the text string or may perform display representing addition of an image or text indicating that the pair of keys is in the automatic reply state. Also, when the portable terminal 100 performs the display in the automatic reply state illustrated in FIG. 13 and an authentication request is not received from the PC 200 for a predetermined time, the display may be changed from the state illustrated in FIG. 13 to the confirmation state of the necessity and non-necessity of a reply to the authentication request using the secret key, as illustrated in FIG. 8.

Another display example of the information indicating that the key is in the automatic reply state will be described. FIG. 14 is as explanatory diagram illustrating an example of the information displayed on the key information display unit 118 by the portable terminal 100. FIG. 14 shows a display example of the information on the key information display unit 118 when the key designated from the PC 200 or in the selection state is in the automatic reply state.

For example, when a response to a challenge is generated using a secret key and a pair of keys designated from the PC 200 or in the selection state are in the automatic reply state, the portable terminal 100 displays an image representing a state in which the key is inserted into the padlock and the padlock is unlocked, as illustrated in FIG. 14, as a secret key state U11 and public key information U12. By displaying the image representing the state in which the key is inserted into the padlock and the padlock is unlocked as the secret key state U11 and the public key information U12, the portable terminal 100 can visually indicate to the user that the pair of keys is in the automatic reply state.

Also, when the image representing the state in which the key is inserted into the padlock and the padlock is unlocked is displayed as the secret key state U11 and the public key information U12 as in FIG. 14, the portable terminal 100 may cause the user to perform a manipulation of extracting the key from the padlock, that is, a manipulation of sliding the secret key state U11 downward, so that the key is changed to a state in which an automatic reply is not made.

The display examples of the key information display unit 118 in which the direction of the portable terminal 100 is the vertical direction have been described above but embodiments of the present disclosure are not limited to the related examples. For example, when the portable terminal 100 can change display according to a direction, the secret key state U11 and the public key information U12 may be displayed in a horizontal state.

FIGS. 15 and 16 are explanatory diagrams illustrating examples of information displayed on the key information display unit 118 by the portable terminal 100. FIGS. 15 and 16 show display examples in which the portable terminal 100 is in the horizontal state. In this way, the portable terminal 100 may appropriately display information on the key information display unit 118 according to a direction.

In smartphones or tablet type terminals, locking is performed so that none may willfully use a smartphone or a tablet terminal, and a manipulation of releasing the lock is generally performed when a screen is turned on from the turned-off state. In the portable terminal 100 according to the embodiment, the above-described key pair display region U1 may also be displayed together on a screen (lock screen) on which a manipulation unlocking is performed, when a state in which one key is usable is shown or a request to use a key is received from the outside.

FIG. 17 is an explanatory diagram illustrating an example of information displayed on the key information display unit 118 by the portable terminal 100. FIG. 17 shows a display example when the above-described key pair display region U1 is displayed together on a lock screen. Also, FIG. 17 shows a state in which a lock releasing manipulation region U4 and an emergency notice button U5 for emergency notice at the time of lock are displayed on the key information display unit 118.

When the key pair display region U1 is displayed together on the lock screen, the portable terminal 100 may display only secret key information U11 and public key information U12. Also, when the key pair display region U1 is displayed together on the lock screen, the portable terminal 100 may display a button U3 for stopping the function of the keys together on the key information display unit 118.

The portable terminal 100 can display the key pair display region U1 together on the lock screen in this way so that the function of the portable terminal 100 is locked, but the keys are is the usable state.

3: EXAMPLE OF HARDWARE CONFIGURATION

Each algorithm described above can be performed by using, for example, the hardware configuration of the information processing apparatus shown in FIG. 18. That is, processing of each algorithm can be realized by controlling the hardware shown in FIG. 18 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 18, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a past of the operation of each structural element based on various programs recorded on the ROM 904, the RAM 906, the storage unit 920, or a removable recording medium 928. The ROM 904 is a storing mechanism, for example, a program to be loaded on the CPU 902 or data or the like used in an arithmetic operation. The RAM 906 temporarily or perpetually stores, for example, a program to be loaded on the CPU 902 or various parameters or the like arbitrarily changed m execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDF or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-Ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE 1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

For example, when the portable terminal 100 has such a hardware configuration, for example, the CPU 902 can fulfill the functions of the control unit 102 and the key generation unit 104. Also, for example, the input unit 916 can fulfill the functions of the key input unit 106, the key selection unit 110, and the key use permission switch unit 116. Also, for example, the ROM 904, the RAM 906, the storage unit 920, or the removable recording medium 928 can fulfill the functions of the key storage unit 108 and the key use permission state storage unit 114. Also, for example, the output unit 918 can fulfill the functions of the key use-time notification unit 112, and the key information display unit 118. Also, for example, the communication unit 926 can fulfill the functions of the reception unit 120 and the transmission unit 122.

4. CONCLUSION

According to the embodiment of the present disclosure, as described above, the portable terminal 100 capable of visually indicating the difference between the roles of the keys used in the public key authentication scheme or the signature scheme using the public key is provided.

The portable terminal 100 according to the embodiment of the present disclosure changes the display of information in a setting in which the public key is used and a setting in which the secret key is used. For example, the portable terminal 100 according to the embodiment of the present disclosure emphasizes and displays information corresponding to the public key in the setting in which the public key is used and emphasizes and displays information corresponding to the secret key in the setting in which the secret key is used. By changing the display of the information in the setting in which the public key is used and the setting in which the secret key is used, the portable terminal 100 can indicate the information to the user so that an incorrect key is not used.

The steps in the processes performed by each apparatus in the present specification may not necessarily be processed chronologically in the orders described in the sequence diagrams and the flowcharts. For example, the steps in the processes performed by each apparatus may be processed in different orders from the orders described in the flowcharts or may be processed in parallel.

Also, a computer program causing hardware such as a CPU, a ROM, and a RAM included in each apparatus to carry out the equivalent functions as the above-described configuration of each apparatus can be generated. Also, a storage medium having the computer program stored therein can be provided. Also, by configuring each functional block illustrated in the functional block diagram as hardware, the series of processes can also be realized by the hardware. Also, the computer program can be distributed as a dedicated application program for various information processing terminals such as smartphones or tablets from a predetermined application distribution site on a network such as the Internet. The application distribution site can be provided by a server apparatus including a storage apparatus feat stores a program and a communication apparatus that transmits the application program in response to a download request from clients (various information processing terminals such as smartphones or tablets).

The preferred embodiments of the present disclosure have been described in detail above with reference to the appended drawings, but embodiments of the present disclosure are not limited to these examples. It should be apparent to those skilled in the art that various modifications and corrections may occur within the scope of the technical spirit described in the claims, and the modifications and the corrections are also, of course, construed to pertain to the technical scope of the present disclosure.

Additionally, the present technology may also be configured as below.

(1)

An information processing apparatus including:

a key storage unit configured to store at least a secret key corresponding to a public key; and a display control unit configured to display a pair of first information corresponding to the public key and second information corresponding to the secret key stored in the key storage unit and different from the first information on a screen.

(2)

The information processing apparatus according to (1), wherein the display control unit emphasizes and displays the first information and the second information in a situation in which the public key is used and a situation in which the secret key is used, respectively, on the screen.

(3)

The information processing apparatus according to (2), wherein the display control unit displays a fact that the secret key is not transmitted on the screen when the display control unit emphasizes and displays the second information.

(4)

The information processing apparatus according to (2) or (3), wherein the display control unit displays a target for which the public key corresponding to the first information or the secret key corresponding to the second information is used on the screen together when the display control unit emphasizes and displays the first information or the second information.

(5)

The information processing apparatus according to any one of (2) to (4), wherein the display control unit displays the first information or the second information in a different form on the screen when the display control unit emphasizes and displays the first information or the second information.

(6)

The information processing apparatus according to any one of (1) to (5), wherein, in a state in which a reply to an authentication request is given automatically using the secret key, the display control unit displays the first information on the screen in a form indicating that the reply to the authentication request is given automatically.

(7)

The information processing apparatus according to (6) further including a key control unit configured to, when the authentication request is not received for a predetermined time in the state in which the reply to the authentication request is given automatically, change a state of the secret key from the state in which the reply to the authentication request is given automatically to a state in which necessity and non-necessity of the reply to the authentication request using the secret key is confirmed.

(8) The information processing apparatus according to any one of (1) to (7), wherein the display control unit displays the pair of first information and second information on a screen for releasing a functional limitation of the information processing apparatus.

(9) The information processing apparatus according to (8), wherein, when the display control unit displays the pair of first information and second information on the screen for releasing the functional limitation of the information processing apparatus, the display control unit limits a manipulation on a pair of the public key and the secret key corresponding to the pair of first information and second information which is being displayed.

(10) The information processing apparatus according to any one of (1) to (9), wherein the display control unit displays the pair of first information and second information on the screen in response to detection of a predetermined manipulation by a user.

(11) The information processing apparatus according to (10), wherein the display control unit displays information regarding the first information or the second information on the screen in response to the detection of the predetermined manipulation by the user.

(12) An information processing method including:
storing at least a secret key corresponding to a public key; and
displaying a pair of first information corresponding to the public key and second information corresponding to the secret key stored in the key storage unit and different from the first information on a screen.

(13) A computer program causing a computer to perform:
storing at least a secret key corresponding to a public key; and
displaying a pair of first information corresponding to the public key and second information corresponding to the secret key stored in the key storage unit and different from the first information on a screen.

(14) An information processing system including: circuitry configured to store at least a secret key corresponding to a public key; and cause display, on a screen, of first information corresponding to the public key and second information corresponding to the secret key stored.

(15) The information processing system of (14), wherein the circuitry modifies display of the first information when the public key is used and modifies display of the second information when the secret key is used.

(16) The information processing system of (15), wherein the circuitry causes an indication to be displayed on the screen that the secret key is not transmitted when the circuitry modifies display of the second information.

(17) The information processing system of any one of (15) to (16), wherein the circuitry causes simultaneous display of a target for which the public key corresponding to the first information or the secret key corresponding to the second information is used when the circuitry modifies display of the first information or the second information.

(18) The information processing system of any one of (15) to (17), wherein the circuitry causes display of the first information or the second information in a different form on the screen when the circuitry modifies the display of the first information or the second information.

(19) The information processing system of any one of (14) to (18), wherein, when a reply to an authentication request is given automatically using the secret key, the circuitry causes display of the first information on the screen in a form indicating that the reply to the authentication request is given.

(20) The information processing system of (19), wherein, when the circuitry is configured to give the reply to the authentication request automatically and the authentication request is not received for a predetermined time the circuitry changes from automatically replying to the authentication request to confirming whether the reply to the authentication request using the secret key is needed.

(21) The information processing system of any one of (14) to (20), wherein the circuitry causes display of the first information and second information on a screen to remove a limit on functionality of the information processing apparatus.

(22) The information processing system of (21), wherein, when the circuitry causes display of the first information and second information on the screen to remove the limit on functionality of the information processing apparatus, the circuitry limits a manipulation on the public key and the secret key respectively corresponding to the first information and second information which is being displayed.

(23) The information processing system of any one of (14) to (22), wherein the circuitry causes display of the first information and second information on the screen in response to detection of a predetermined manipulation by a user.

(24) The information processing system of (23), wherein the circuitry displays information regarding the first information or the second information on the screen in response to the detection of the predetermined manipulation by the user.

(25) An information processing method including: storing, with circuitry, at least a secret key corresponding to a public key; and displaying first information corresponding to the public key and second information corresponding to the secret key stored.

(26) A non-transitory computer-readable medium encoded with computer-readable instructions that, when executed by a computer, cause the computer to perform a method including: storing at least a secret key corresponding to a public key; and displaying first information corresponding to the public key and second information corresponding to the secret key.

REFERENCE SIGNS LIST

1 information processing system
100 portable terminal
200 PC
300 service apparatus

The invention claimed is:
1. An information processing system, comprising:
a display screen;
a key input unit configured to input a public key and a secret key based on a first user operation on the key input unit;
a storage unit configured to store the secret key corresponding to the public key; and
circuitry configured to:
control the display screen to display public key information and secret key information, wherein the public key information is associated with the public key, and
wherein the secret key information is associated with the secret key;
receive a first request from a device based on the public key;
identify the secret key, corresponding to the public key, by modification of the display of the public key information and the display of the secret key information on the display screen,
wherein the modification of the display of the public key information and the display of the secret key information is based on the received first request; and
transmit a response to the received first request based on a second user operation on the modified display of the secret key information, wherein the response is transmitted to the device.

2. The information processing system according to claim 1, wherein the circuitry is further configured to:
receive a second request from the device; and
identify the public key by modification of modify the display of the public key information on the display screen,
wherein the modification of the display of the public key information is based on the received second request.

3. The information processing system according to claim 1,
wherein the modification of the display of the secret key information comprises a display of an indication on the display screen, and
wherein the indication conveys that transmission of the secret key is forbidden from the information processing system to the device.

4. The information processing system according to claim 1,
wherein the circuitry is further configured to control the display screen to display a name of a target corresponding to one of the public key information or the secret key information, and
wherein the name of the respective target is displayed concurrently with one of the modified display of the public key information or the modified display of the secret key information.

5. The information processing system according to claim 1, wherein the modification of the display of the secret key information and the public key information comprises display of one of the public key information in a first form or the secret key information in a second form on the display screen.

6. The information processing system according to claim 1, wherein the circuitry is further configured to:
receive an authentication request from the device; and
modify the display of the public key information to indicate that a reply to the authentication request is in automatic reply state,
wherein the indication of the automatic reply state is based on a setting of the reply to the authentication request stored in the storage unit.

7. The information processing system according to claim 6, wherein the circuitry is further configured to change the modified display of the public key information to confirm the necessity of the reply based on failure of the circuitry to receive the authentication request from the device for a threshold time.

8. The information processing system according to claim 1, wherein the circuitry is further configured to control the display screen to display the public key information and the secret key information to remove a limit on functionality of an information processing apparatus.

9. The information processing system according to claim 8, wherein, when the public key information and the secret key information are displayed on the display screen to remove the limit on the functionality of the information processing apparatus, the circuitry is further configured to limit a manipulation on the displayed public key information and the displayed secret key information.

10. The information processing system according to claim 1, wherein the circuitry is further configured to control the display screen to display the public key information and the secret key information based on a detection of a user manipulation.

11. The information processing system according to claim 10,
wherein the circuitry is further configured to control the display screen to display information regarding one of the public key information or the secret key information, and
wherein the control of the display of the information is based on the detection of the user manipulation.

12. An information processing method, comprising:
inputting, by a key input unit of an information processing system, a public key and a secret key based on a first user operation on the key input unit;
storing, in a storage unit of the information processing system, the secret key corresponding to the public key;
displaying public key information and secret key information on a display screen of the information processing system,
wherein the public key information is associated with the public key, and
wherein the secret key information is associated with the secret key;
receiving, by circuitry of the information processing system, a first request from a device based on the public key;
identifying the secret key, corresponding to the public key, by modification of the display of the public key information and the display of the secret key information on the display screen, wherein the modification of the display of the public key information and the display of the secret key information is based on the received first request; and
transmitting a response to the received first request based on a second user operation on the modified display of the secret key information, wherein the response is transmitted to the device.

13. A non-transitory computer-readable medium having stored thereon computer-readable instructions that, when executed by a computer, cause the computer to perform operations, the operations comprising:
inputting, by a key input unit of an information processing system, a public key and a secret key based on a first user operation on the key input unit;
storing in a storage unit of the information processing system, the secret key corresponding to the public key;
displaying public key information and secret key information on a display screen of the information processing system,
wherein the public key information is associated with the public key, and
wherein the secret key information is associated with the secret key;

receiving, by circuitry of the information processing system, a first request from a device based on the public key;

identifying the secret key, corresponding to the public key, by modification of the display of the public key information and the display of the secret key information on the display screen, wherein the modification of the display of the public key information and the display of the secret key information is based on the received first request; and transmitting a response to the received first request based on a second user operation on the modified display of the secret key information, wherein the response is transmitted to the device.

\* \* \* \* \*